United States Patent
Ovsiannikov et al.

(10) Patent No.: US 11,360,930 B2
(45) Date of Patent: Jun. 14, 2022

(54) NEURAL PROCESSING ACCELERATOR

(71) Applicant: Samsung Electronics Co., Ltd., Suwon-si (KR)

(72) Inventors: Ilia Ovsiannikov, Northridge, CA (US); Yibing Michelle Wang, Temple City, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1123 days.

(21) Appl. No.: 15/916,189

(22) Filed: Mar. 8, 2018

(65) Prior Publication Data

US 2019/0187983 A1    Jun. 20, 2019

Related U.S. Application Data

(60) Provisional application No. 62/607,882, filed on Dec. 19, 2017.

(51) Int. Cl.
*G06F 15/173* (2006.01)
*G06F 17/16* (2006.01)
(Continued)

(52) U.S. Cl.
CPC ...... *G06F 15/17343* (2013.01); *G06F 7/5332* (2013.01); *G06F 7/5443* (2013.01);
(Continued)

(58) Field of Classification Search
CPC . G06N 3/06; G06N 3/063; G06N 3/08; G06F 17/15; G06F 17/153; G06F 17/16;
(Continued)

(56) References Cited

U.S. PATENT DOCUMENTS 10,074,051 B2    9/2018  Thorson et al.
10,417,525 B2    9/2019  Ji et al.
(Continued)

FOREIGN PATENT DOCUMENTS

CN    105447498 A    3/2016
EP    3 035 203 A1   6/2016
(Continued)

OTHER PUBLICATIONS

O. Atak et al., Bi1RC: An Execution Triggered Course Grained Reconfigurable Architecture, IEEE Transactions on Very Large Scale Integration (VLSI) Systems, vol. 21 No. 7, 2013 (Year: 2013).*

(Continued)

*Primary Examiner* — Emily E Larocque
(74) *Attorney, Agent, or Firm* — Lewis Roca Rothgerber Christie LLP

(57) ABSTRACT

A system for calculating. A scratch memory is connected to a plurality of configurable processing elements by a communication fabric including a plurality of configurable nodes. The scratch memory sends out a plurality of streams of data words. Each data word is either a configuration word used to set the configuration of a node or of a processing element, or a data word carrying an operand or a result of a calculation. Each processing element performs operations according to its current configuration and returns the results to the communication fabric, which conveys them back to the scratch memory.

20 Claims, 27 Drawing Sheets

(51) Int. Cl.
*G06F 7/533* (2006.01)
*G06F 7/544* (2006.01)
*G06F 13/16* (2006.01)
*G06N 3/08* (2006.01)
*G06F 7/57* (2006.01)
*G06F 9/38* (2018.01)
*G06F 17/15* (2006.01)

(52) U.S. Cl.
CPC ............. *G06F 7/57* (2013.01); *G06F 9/3889* (2013.01); *G06F 9/3897* (2013.01); *G06F 13/1673* (2013.01); *G06F 17/15* (2013.01); *G06F 17/16* (2013.01); *G06N 3/08* (2013.01)

(58) Field of Classification Search
CPC ...... G06F 9/30–30036; G06F 9/30098–30141; G06F 9/3877–3897; G06F 15/7867–7882; G06F 15/17343; G06F 7/5443; G06F 7/57; G06F 7/575
See application file for complete search history.

(56) References Cited

U.S. PATENT DOCUMENTS

| | | | |
|---|---|---|---|
| 10,699,188 B2 | 6/2020 | Ross et al. | |
| 2005/0248578 A1* | 11/2005 | Meeker | G06T 7/246 345/505 |
| 2014/0092728 A1 | 4/2014 | Rivera et al. | |
| 2014/0095923 A1 | 4/2014 | Rivera et al. | |
| 2016/0179434 A1 | 6/2016 | Herrero Abellanas et al. | |
| 2017/0277658 A1 | 9/2017 | Pratas et al. | |

FOREIGN PATENT DOCUMENTS

| | | |
|---|---|---|
| TW | 201710959 A | 3/2017 |
| TW | 201729124 A | 8/2017 |

OTHER PUBLICATIONS

M. Wen et al., Multiple-Morphs Adaptive Stream Architecture, J. Comput. Sci. & Technol., vol. 20, No. 5, p. 635-646, 2005 (Year: 2005).*

M.A. Tajammul et al., NoC Based Distributed Partitionable Memory System for a Course Grain Reconfigurable Architecture, 2011 24th Annual Conference on VLSI Design, 2011 (Year: 2011).*

R. Prabhakar et al., Plasticine: A Reconfigurable Architecture for Parallel Patterns, ISCA '17, ACM Jun. 28, 2017 (Year: 2017).*

Schuman, Catherine D., et al. "A Survey of Neuromorphic Computing and Neural Networks in Hardware", U.S. Department of Energy and Oak Ridge National Laboratory, 88 pgs, May 19, 2017.

* cited by examiner

NEURAL PROCESSING ACCELERATOR

CROSS-REFERENCE TO RELATED APPLICATION(S)

The present application claims priority to and the benefit of U.S. Provisional Application No. 62/607,882, filed Dec. 19, 2017, entitled "NEURAL PROCESSING ACCELERATOR ARCHITECTURE", the entire content of which is incorporated herein by reference.

FIELD

One or more aspects of embodiments according to the present invention relate to a processing system, and more particularly to configurable system for performing parallel calculations.

BACKGROUND

Related art processing systems for neural network training and inference may be costly, and may lack the flexibility to be readily adaptable to various tensor calculations frequently used in neural network calculations, such as efficient sparse operations.

Thus, there is a need for an improved system for performing neural network calculations.

SUMMARY

Aspects of embodiments of the present disclosure are directed toward a system for calculating. A scratch memory is connected to a plurality of configurable processing elements by a communication fabric including a plurality of configurable nodes. The scratch memory sends out a plurality of streams of data words. Each data word is either a configuration word used to set the configuration of a node or of a processing element, or a data word carrying an operand or a result of a calculation. Each processing element performs operations according to its current configuration and returns the results to the communication fabric, which conveys them back to the scratch memory.

According to an embodiment of the present invention there is provided a system for calculating, the system including: a plurality of processing element circuits; a communication fabric including a plurality of node circuits; and a scratch memory, the scratch memory being connected to the processing element circuits through the communication fabric, one or more of the processing element circuits including a configuration register configured to store a configuration value, one or more of the processing element circuits being configured: to receive, at two inputs, two respective data words, each of the two data words having a control portion and a data portion, and: when one of the two data words has a control portion identifying it as a processing element configuration word, to store the data portion of the processing element configuration word in the configuration register; and when neither of the two data words is a processing element configuration word, to perform an operation on the two data words, in accordance with the configuration value.

In one embodiment, the performing of the operation includes: when the configuration value specifies an element-wise multiplication, multiplying the data portion of a first data word of the two data words by the data portion of a second data word of the two data words.

In one embodiment, the performing of the operation includes: when the configuration value specifies an element-wise addition, adding the data portion of a first data word of the two data words to the data portion of a second data word of the two data words.

In one embodiment, the performing of the operation includes: when the configuration value specifies multiplication and accumulation: forming a product by multiplying the data portion of a first data word of the two data words by the data portion of a second data word of the two data words, and adding the product to an accumulator value.

In one embodiment, one of the processing element circuits includes 5,000 or fewer gates.

In one embodiment, one of the node circuits includes 2,000 or fewer gates.

According to an embodiment of the present invention there is provided a system for calculating, the system including: a plurality of processing element circuits; a communication fabric including a plurality of node circuits; and a scratch memory, the scratch memory being connected to the processing element circuits through the communication fabric, one or more of the of the node circuits including a plurality of node link circuits, a first node link circuit of the plurality of node link circuits of a first node circuit of the plurality of node circuits having a plurality of inputs and an output, and including: a data register, and a configuration register configured to store a configuration value, the first node link circuit being configured to receive, at the inputs, a plurality of respective data words, each of the data words having a control portion and a data portion, and: when one of the data words has a control portion identifying it as a node link configuration word, to store the data portion of the node link configuration word in the configuration register; and when none of the data words is a node link configuration word: to send a data word from one of the inputs to the data register, and/or to send a data word from one of the inputs to the output, and/or to send a data word from the data register to the output, depending on the configuration value.

In one embodiment, one or more of the node circuits has: four inputs extending outward from the node circuit in substantially orthogonal directions and four outputs extending outward from the node circuit in substantially orthogonal directions.

In one embodiment, a node circuit of the one or more node circuits includes four node link circuits, each having: four inputs connected respectively to the four inputs of the node circuit, and an output connected to a respective one of the four outputs of the node circuit.

In one embodiment, one of the processing element circuits includes 5,000 or fewer gates.

In one embodiment, one of the node circuits includes 2,000 or fewer gates.

In one embodiment, the system includes a plurality of row caches, one or more of the row caches having the same bit width as the data words, the memory controller being configured to transfer data to the row caches from the memory bank, and to the memory bank from the row caches, one or more of the row caches being configured to: stream out a sequence of data words, and stream in a sequence of data words.

In one embodiment, one of the row caches is a double buffer.

In one embodiment, the control portion of each data word has a width of four bits, and the data portion of each data word has a width of sixteen bits.

According to an embodiment of the present invention there is provided a method for calculating, the method including: configuring a processing module, the processing module including: a plurality of processing element circuits; a communication fabric including a plurality of node link circuits each having a plurality of inputs and an output; and a scratch memory, the configuring including: sending, by the scratch memory, a plurality of node link configuration words, each addressed to a node link circuit of the plurality of node link circuits; receiving, by a first node link circuit of the plurality of node link circuits, a data word addressed to the first node link circuit, the first node link circuit having an output connected to an input of a first processing element circuit of the plurality of processing element circuits; setting, by the first node link circuit, a configuration of the first node link circuit, to cause the first node link circuit to forward data words received at a first input of the first node link circuit to the output of the first node link circuit; receiving, by the first input of the first node link circuit, a processing element configuration word; sending, by the first input of the first node link circuit, the processing element configuration word to the first processing element circuit; and storing, by the first processing element circuit, in a configuration register of the first processing element circuit, a data portion of the processing element configuration word.

In one embodiment, the method includes calculating a plurality of products, the calculating including sending, by the scratch memory, through a first path extending through a first plurality of node link circuits, a first sequence of operands to the first processing element circuit; sending, by the scratch memory, through a second path extending through a second plurality of node link circuits, a second sequence of operands to the first processing element circuit; calculating, by the first processing element circuit, a sequence of pairwise products, each pairwise product being a product of: an operands of the first sequence of operands, and a corresponding operand of the second sequence of operands.

In one embodiment, the method includes converting a first vector from a dense representation to a sparse representation, the first vector including a first element having a nonzero value immediately followed by a second element having a value of zero, the converting including substituting for the first element a first 2-tuple having: a first element equal to the first element of the first vector, and a second element greater than one.

In one embodiment, the method includes aligning a sparse representation of a second vector with the sparse representation of the first vector, the aligning including: deleting from the sparse representation of the second vector a 2-tuple corresponding to the second element of the first vector, and increasing the value of the second element of a first 2-tuple of the second vector, the first 2-tuple of the second vector immediately preceding the deleted 2-tuple.

In one embodiment, the method includes: multiplying, by a processing element circuit of the plurality of processing element circuits, the first element of the first 2-tuple of the first vector by the first element of the first 2-tuple of the second vector, to form the first element of a result 2-tuple; and setting the second element of the result 2-tuple to be equal to the second element of the first 2-tuple of the first vector.

In one embodiment, one of the processing element circuits includes 5,000 or fewer gates, and one of the node link circuits includes 500 or fewer gates.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a neural processing accelerator provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
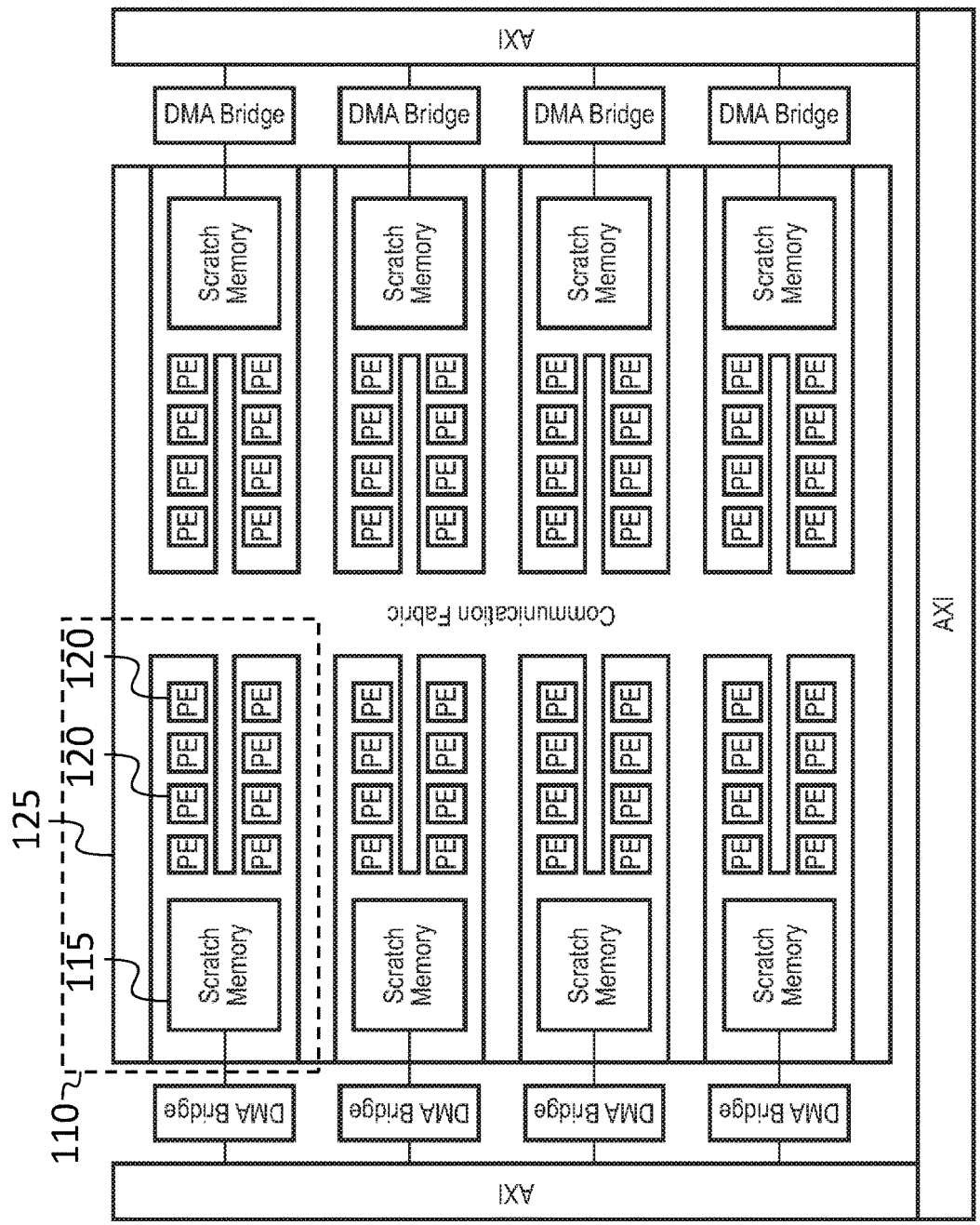
FIG. 1 is a schematic layout diagram of a system for calculating, according to an embodiment of the present invention.

Referring to FIG. 1, in some embodiments a neural processing system includes a plurality of processing modules 110, each including a scratch memory 115, and a plurality of processing elements 120 (labeled PE), the processing elements 120 being connected to each other and to the scratch memory by a communication fabric 125. In operation, the scratch memory 115 feeds operands to the processing elements 120 through the communication fabric 125, the processing elements 120 process the operands to generate results, and the results are fed back to the scratch memory 115 (or to another scratch memory 115) through the communication fabric 125. The communication fabric 125 includes a plurality of interconnected nodes each of which has a plurality of inputs and outputs, and is programmable to direct data from any of its inputs to any of its outputs, as described in further detail below. As such, the communications fabric 125 may be programmed to establish data paths between the scratch memory and the processing elements 120, and between any one of the processing elements 120 and any other processing element 120. Although FIG. 1 is not to scale, some embodiments use the layout of FIG. 1 to provide relatively short communication paths, through the communication fabric 125, between the processing elements 120, and between the scratch memory 115 and the processing elements 120.

Figure 2A:
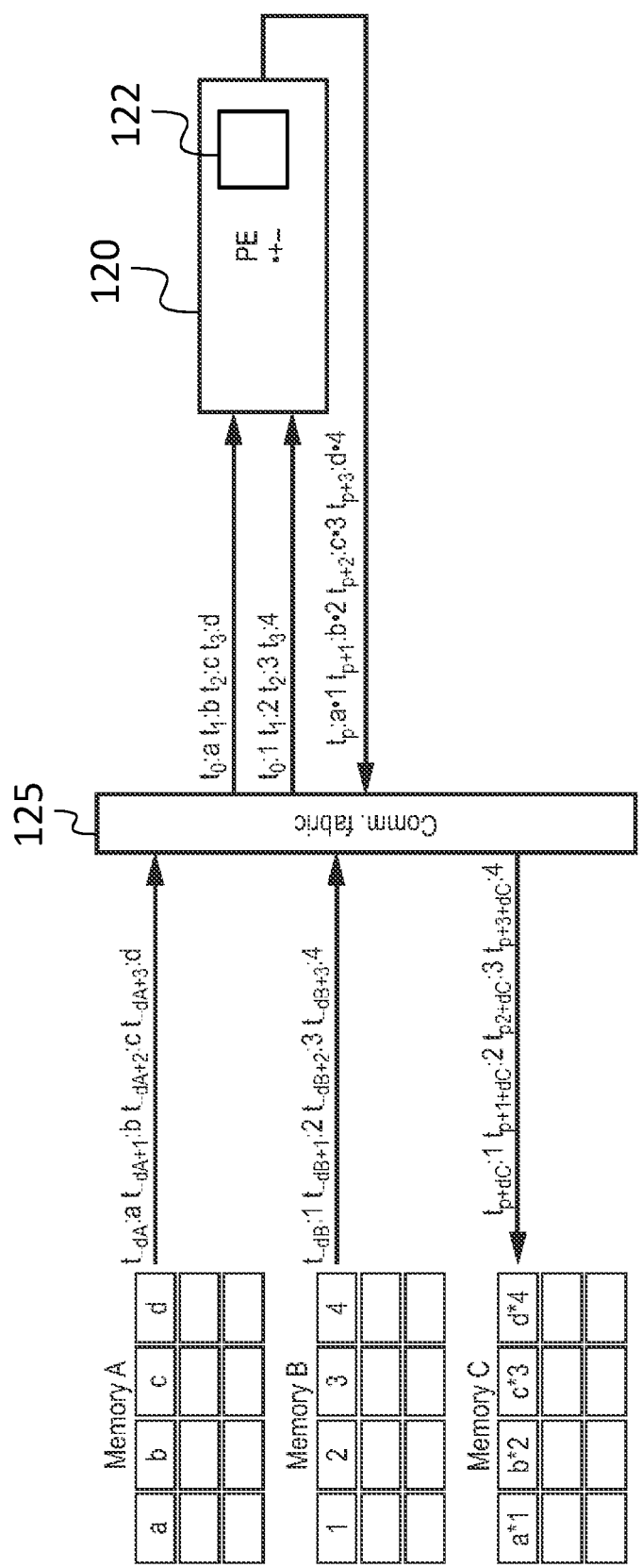
FIG. 2A is a data flow diagram for a calculation, according to an embodiment of the present invention.

The neural processing system illustrated in FIG. 1 may be suitable for efficiently performing a variety of processing tasks efficiently, as described in further detail below, with reference to FIGS. 2A-2I and FIGS. 3A-3E. FIG. 2A shows how element-wise vector operations, such as the element-wise vector product, $$\overline{C}=\overline{A}\odot\overline{B}=[a\ b\ c\ d]\odot[1\ 2\ 3\ 4]=[a\cdot 1\ b\cdot 2\ c\cdot 3\ d\cdot 4],$$

may be performed. In some embodiments, the module, or the entire neural processing system, is a synchronous digital circuit with a single clock domain. A stream of first operands is fed, one per clock cycle, out of memory A and a stream of second operands is fed, one per clock cycle, out of memory B. Each stream of operands is, in general, delivered to the processing element 120 with a different delivery delay. Accordingly, each operand is sent in advance of the time that it is scheduled to be processed. In the notation of FIG. 2A, for example, the first two operands are scheduled to be received by the processing element 120 at a time $t_0$. To be received by the processing element 120 at a time $t_0$, the first operand from memory A is sent at a time $t_{dA}$, where the subscript denotes the time in clock cycles, i.e., the first operand from memory A is sent at a time preceding $t_0$ by dA clock cycles, where dA is the time the communication fabric 125 takes to deliver an operand from memory A to the processing element 120. Similarly, to be received by the processing element 120 at a time $t_0$, the first operand from memory B is sent at a time $t_{dB}$, i.e., the first operand from memory B is sent at a time preceding $t_0$ by dB clock cycles, where dB is the time the communication fabric 125 takes to deliver an operand from memory A to the processing element 120. The delivery delays dA and dB may be the same or they may be different. Each delivery delay may depend on the path that data takes through the communication fabric 125, and also on the configuration of the nodes along the path (each of the nodes may have a configurable delay). The remaining operands may subsequently be sent out from memory A and memory B, one per memory per clock cycle, as shown. Other element-wise operations, such as an element-wise sum or difference may be performed in the same manner, with the processing element 120 configured (as discussed in further detail below) to perform the appropriate operation.

The processing element 120 may process the data and send the results (which may be considered to be four products, or the four elements of a four-element (element-wise) product vector), to a third memory, memory C. The processing delay is identified in FIG. 2A as $t_p$, i.e., p clock cycles.

Memory A, memory B and memory C may all be part of one scratch memory 115 (i.e., the scratch memory of one processing module 110) or one or more of them may be parts of different scratch memories 115.

Figure 2B:
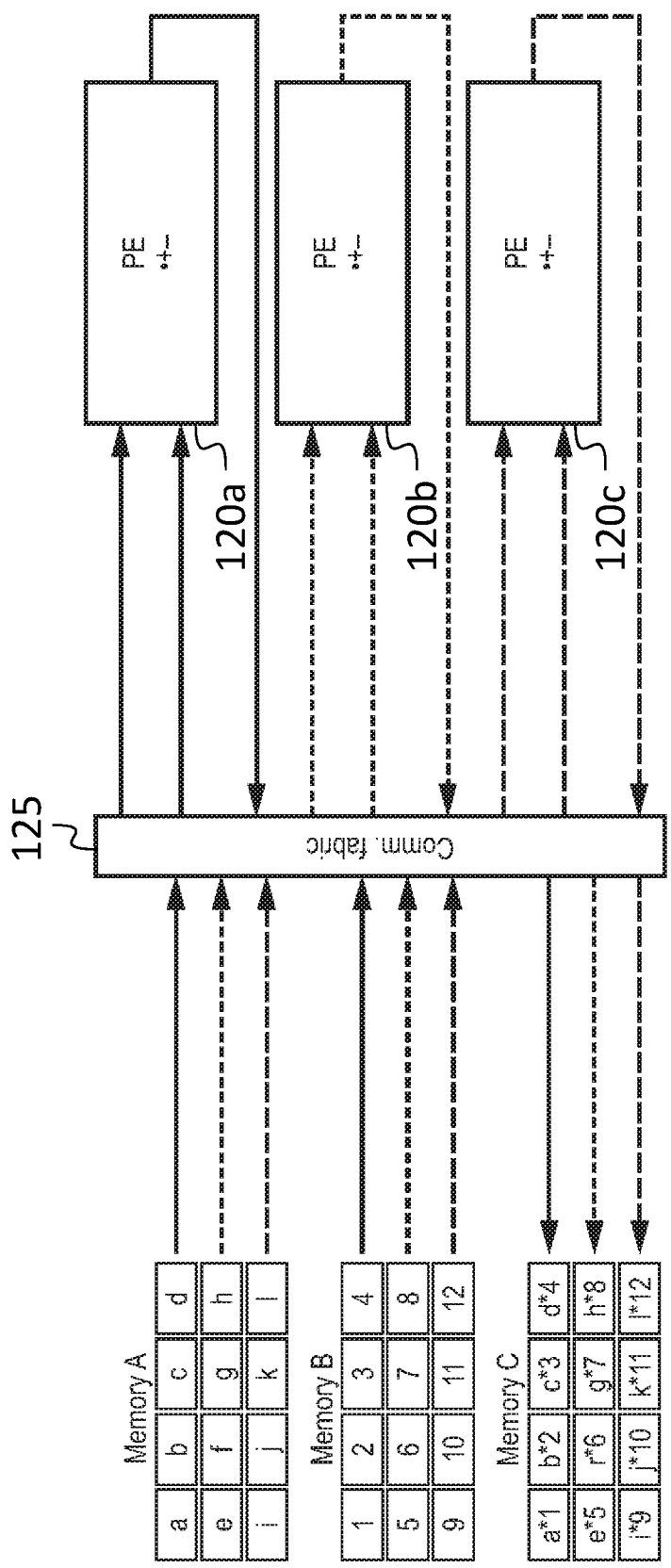
FIG. 2B is a data flow diagram for a calculation, according to an embodiment of the present invention.

FIG. 2B shows how element-wise matrix operations, such as the element-wise matrix product, $$C = A\odot B = \begin{bmatrix} a & b & c & d \\ e & f & g & h \\ i & j & k & l \end{bmatrix} \odot \begin{bmatrix} 1 & 2 & 3 & 4 \\ 5 & 6 & 7 & 8 \\ 9 & 10 & 11 & 12 \end{bmatrix} = \begin{bmatrix} a\cdot 1 & b\cdot 2 & c\cdot 3 & d\cdot 4 \\ e\cdot 5 & f\cdot 6 & g\cdot 7 & h\cdot 8 \\ i\cdot 9 & j\cdot 10 & k\cdot 11 & l\cdot 12 \end{bmatrix},$$

may be performed. Three parallel streams of first operands (each corresponding to one row of the first multiplicand) are fed out of memory A and three parallel streams of second operands (each corresponding to one row of the second multiplicand) are fed out of memory B. The element-wise product of the first row of the first multiplicand and the first row of the second multiplicand is formed, one pair of elements at a time, by a first processing element 120a. Similarly, the element-wise products of the second and third rows of the first multiplicand and the second and third rows of the second multiplicand are formed, one pair of elements at a time, by a second processing element 120b and a third processing element 120c, respectively. Each element-wise product of a row of the first multiplicand and a corresponding row of the second multiplicand is formed using a respective copy of the circuit of FIG. 2A. As such, the element-wise product is performed in a manner that is parallelized by a factor of three, the three vector operations (corresponding to the three pairs of rows to be multiplied) being performed in parallel. In other embodiments, the same operation may be performed in serial (with memory A sending out the twelve elements of the first operand one at a time, in a single stream, and memory B sending out the twelve elements of the second operand one at a time, in a single stream), or with a different degree of parallelization (e.g., the operations being parallelized by a factor of four by having each one of four processing elements 120 perform the three multiplications involved in forming an element-wise product of a respective column of the first multiplicand with a corresponding column of the second multiplicand.

Figure 2C:
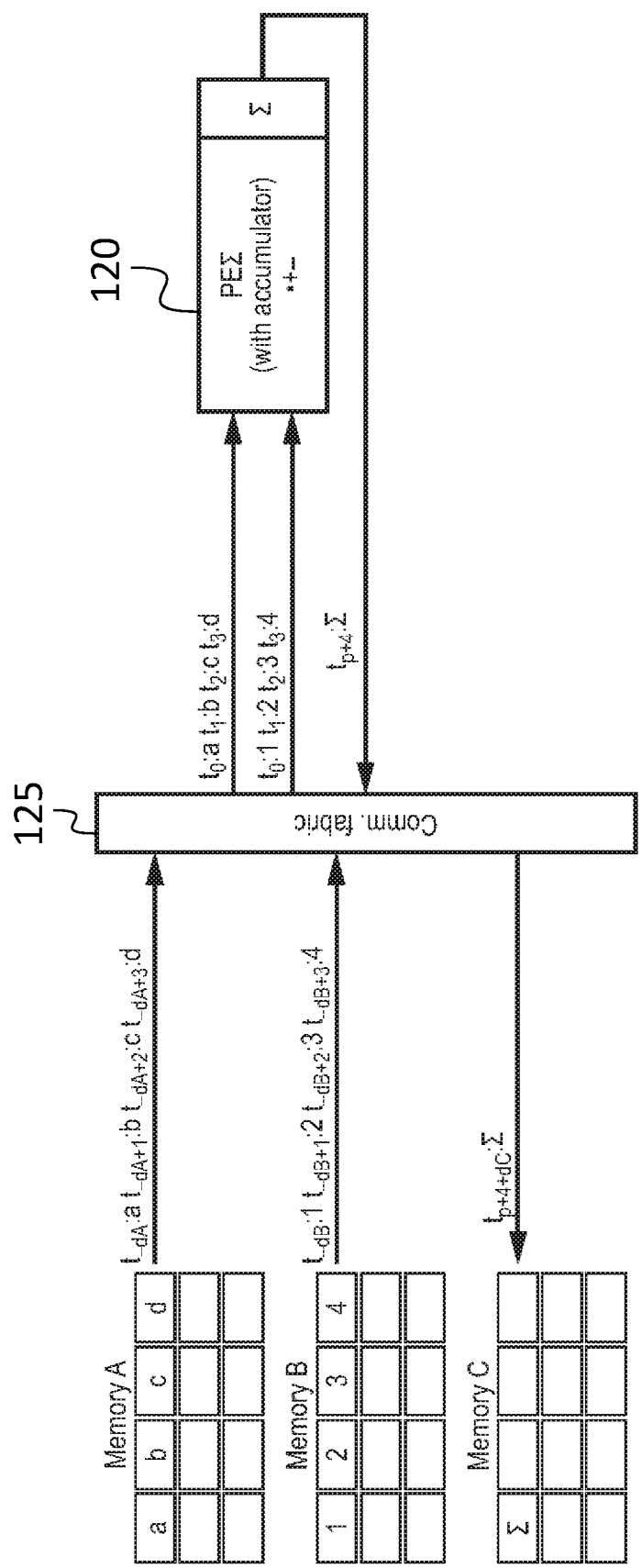
FIG. 2C is a data flow diagram for a calculation, according to an embodiment of the present invention.

FIG. 2C shows how a vector dot product, e.g., $$\overline{C}=\overline{A}\cdot\overline{B}=[a\ b\ c\ d]\cdot[1\ 2\ 3\ 4]=a\cdot 1+b\cdot 2+c\cdot 3+d\cdot 4,$$

may be performed. As in the case of an element-wise vector product, a stream of first operands is fed out of memory A and a stream of second operands is fed out of memory B. The processing element 120 accumulates the element-wise products to form the dot product, and sends the result to a third memory, memory C. An accumulator in the processing element 120 may be reset when the processing element 120 receives a configuration command (as described in further detail below).

Figure 2D:
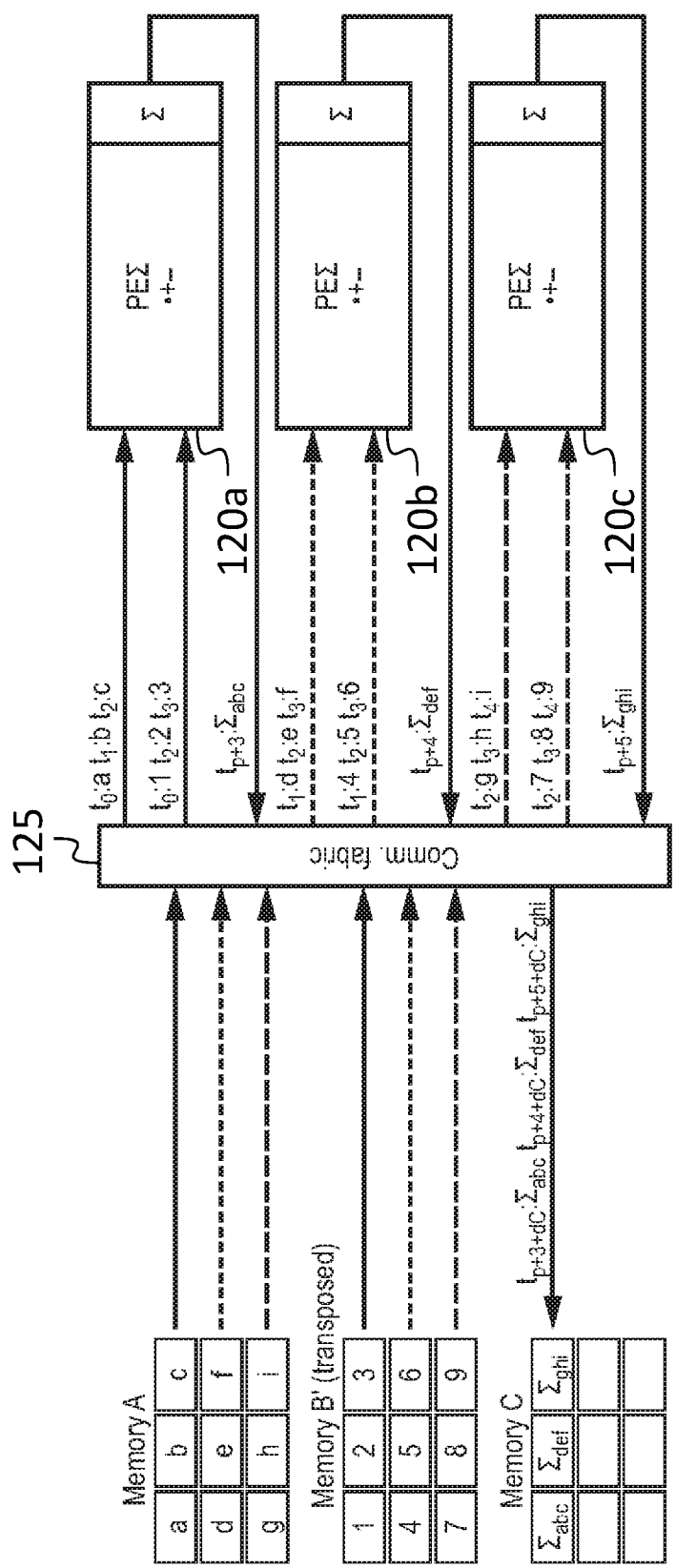
FIG. 2D is a data flow diagram for a calculation, according to an embodiment of the present invention.

FIG. 2D shows how a vector consisting of the diagonal elements of a matrix product, e.g., $$C = \text{diag}\{A \cdot B\} = \text{diag}\left\{\begin{bmatrix} a & b & c \\ d & e & f \\ g & h & i \end{bmatrix} \cdot \begin{bmatrix} 1 & 4 & 7 \\ 2 & 5 & 8 \\ 3 & 6 & 9 \end{bmatrix}\right\} = \begin{bmatrix} a\cdot 1 + b\cdot 2 + c\cdot 3 \\ d\cdot 4 + e\cdot 5 + f\cdot 6 \\ g\cdot 7 + h\cdot 8 + i\cdot 9 \end{bmatrix},$$

may be formed. Each of the elements of the result vector is a dot product of a row of the first input matrix (the first multiplicand) and a column of the second input matrix (the second multiplicand). Each of these dot products is calculated in the manner described above, with reference to FIG. 2C (the first dot product being calculated by a first processing element 120a, the second dot product being calculated by a second processing element 120b, and the third dot product being calculated by a third processing element 120c). An entire matrix product (including the diagonal elements calculated as in FIG. 2D and also the off-diagonal elements) may be calculated in an analogous manner, since each of the elements of the matrix product is a dot product of one row of the first multiplicand and a column of the second multiplicand.

Figure 2E:
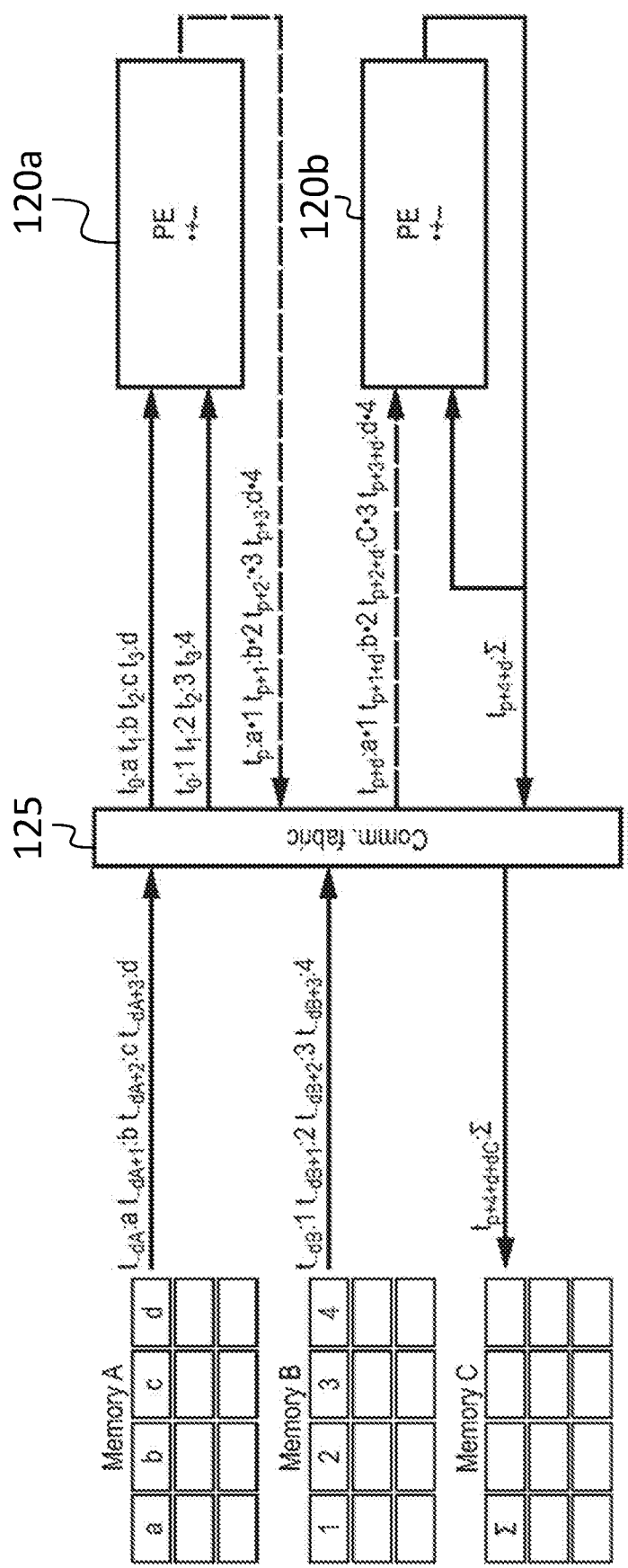
FIG. 2E is a data flow diagram for a calculation, according to an embodiment of the present invention.

FIG. 2E shows how a how a vector dot product, e.g., $$\overline{C} = \overline{A} \cdot \overline{B} = [a\ b\ c\ d] \cdot [1\ 2\ 3\ 4] = a\cdot 1 + b\cdot 2 + c\cdot 3 + d\cdot 4,$$

may be formed using processing elements 120 that lack accumulators. A first processing element 120a forms the element-wise products, and a second processing element 120b acts as an accumulator.

Figure 2F:
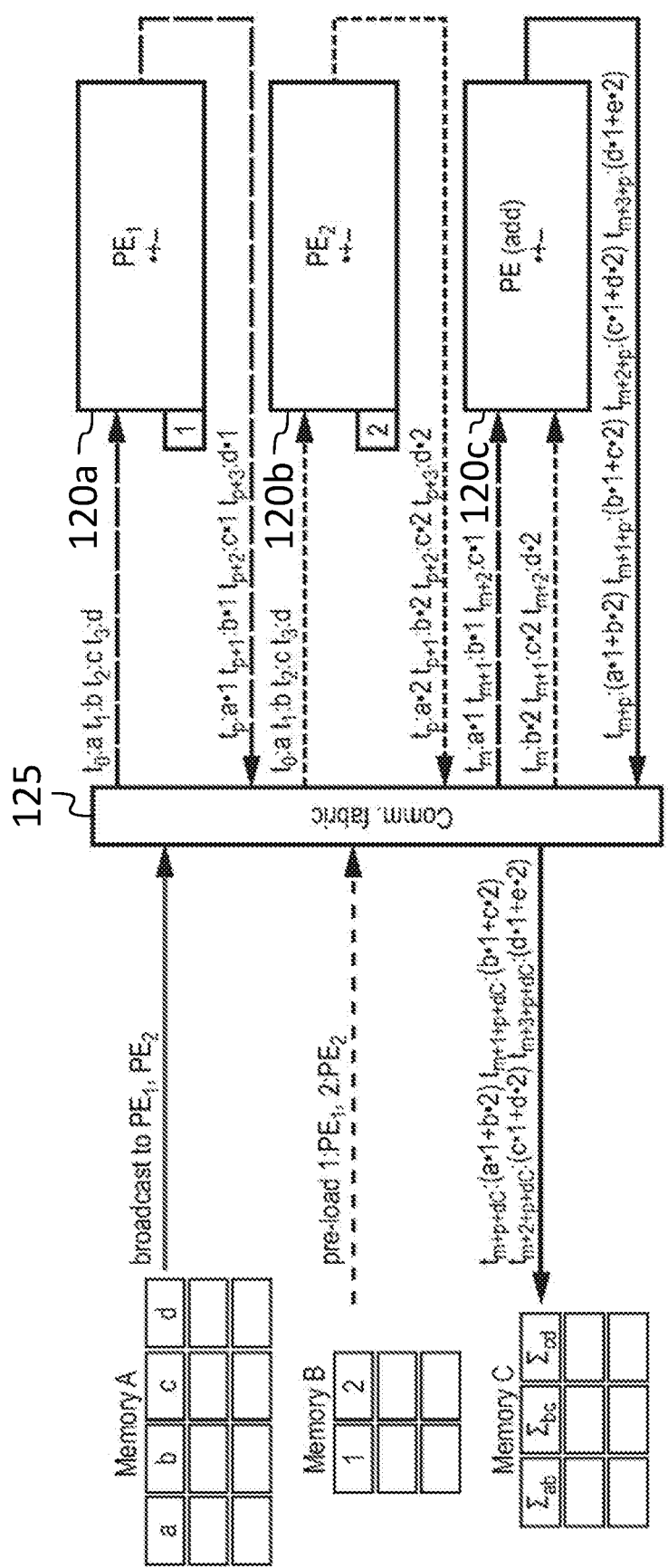
FIG. 2F is a data flow diagram for a calculation, according to an embodiment of the present invention.

FIG. 2F shows how a one dimensional convolution with a constant kernel, e.g., $$\overline{C} = \overline{A} * \overline{B} = [a\ b\ c\ d] * [1\ 2] = [(a\cdot 1 + b\cdot 2)(b\cdot 1 + c\cdot 2)(c\cdot 1 + d\cdot 2)],$$

may be performed. The elements of the kernel ([1 2]) are pre-programmed into a first processing element 120a and into a second processing element 120b (or into two respective nodes of the configuration fabric connected to the second input of each of these two processing elements 120, as described in further detail below), e.g,. by memory B. A stream of operands (in this case, the values [a b c d]) is fed out of memory A and broadcast to both the first processing element 120a and the second processing element 120b (as a result of suitable prior configuration of the communication fabric 125, discussed in further detail below). The first processing element 120a multiplies each element of the stream of operands by the first element of the kernel (in this example, 1) and the second processing element 120b multiplies each element of the stream of operands by the second element of the kernel (in this example, 2). The streams of products are sent to a third processing element 120c, with the second stream of products (generated by the second processing element 120b) delayed by one clock cycle so that that the products a·1 and b·2 arrive at the third processing element 120c at the same time. The communication fabric 125, or the third processing element 120c, may be reconfigured, as described in further detail below, during the clock cycle preceding the arrival of the products a·1 and b·2 so that the product a·2, which otherwise would be received, and processed, by the third processing element 120c, in the preceding clock cycle, is discarded by the communication fabric 125 or by the third processing element 120c. The product d·1 may also be discarded, in a similar manner. The third processing element 120c sums the products (except those that are discarded) pairwise and sends the sums to the memory C as shown.

Figure 2G:
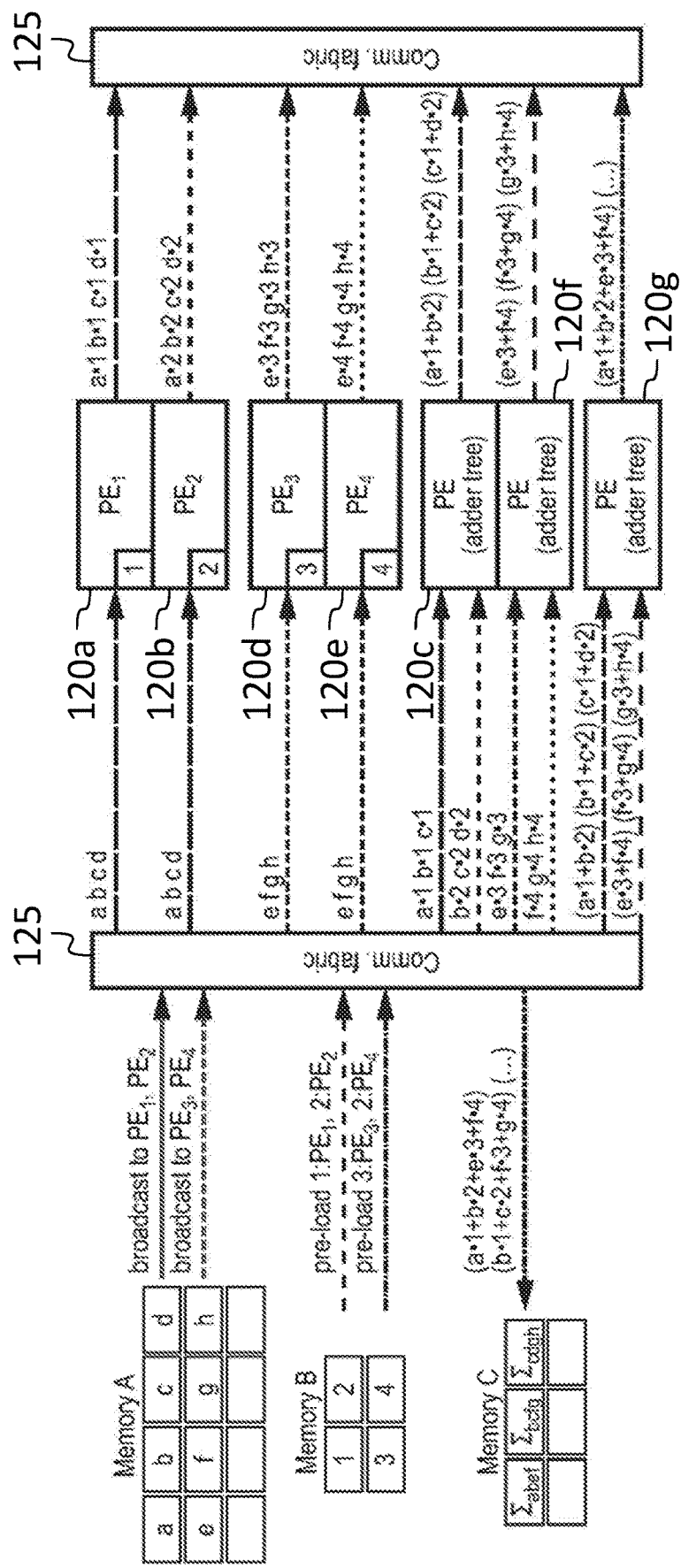
FIG. 2G is a data flow diagram for a calculation, according to an embodiment of the present invention.

FIG. 2G shows how a two dimensional convolution with a constant kernel, e.g., $$C = A * B = \begin{bmatrix} a & b & c & d \\ e & f & g & h \end{bmatrix} * \begin{bmatrix} 1 & 2 \\ 3 & 4 \end{bmatrix} = [(a\cdot 1 + b\cdot 2 + e\cdot 3 + f\cdot 4)$$

$$(b\cdot 1 + c\cdot 2 + f\cdot 3 + g\cdot 4)(c\cdot 1 + d\cdot 2 + g\cdot 3 + h\cdot 4)],$$

may be performed. The elements of the first row of the kernel are pre-programmed into a first processing element 120a and into a second processing element 120b, e.g,. by memory B. As in the case of the one-dimensional convolution, A stream of operands (in this case, the values [a b c d]) is fed out of memory A and broadcast to both the first processing element 120a and the second processing element 120b (as a result of suitable prior configuration of the communication fabric 125, discussed in further detail below). The first processing element 120a multiplies each element of the stream of operands by the first element of the kernel (in this example, 1) and the second processing element 120b multiplies each element of the stream of operands by the second element of the kernel (in this example, 2). The streams of products are sent to a third processing element 120c, with the second stream of products (generated by the second processing element 120b) delayed by one clock cycle so that that the products a·1 and b·2 arrive at the third processing element 120c at the same time. Products that are not part of the convolution are discarded (by reconfiguring one or more of the processing element 120 and the communication fabric 125), and the third processing element 120c sums the products (except those that are discarded) pairwise as shown. A fourth processing element 120d, a fifth processing element 120e, and a sixth processing element 120f together form analogous sums of products of the second row of the input matrix with the second row of the kernel. The sums generated by the third processing element 120c and the sixth processing element 120f are fed to a seventh processing element 120g, which forms the final convolution, as shown.

Figure 2H:
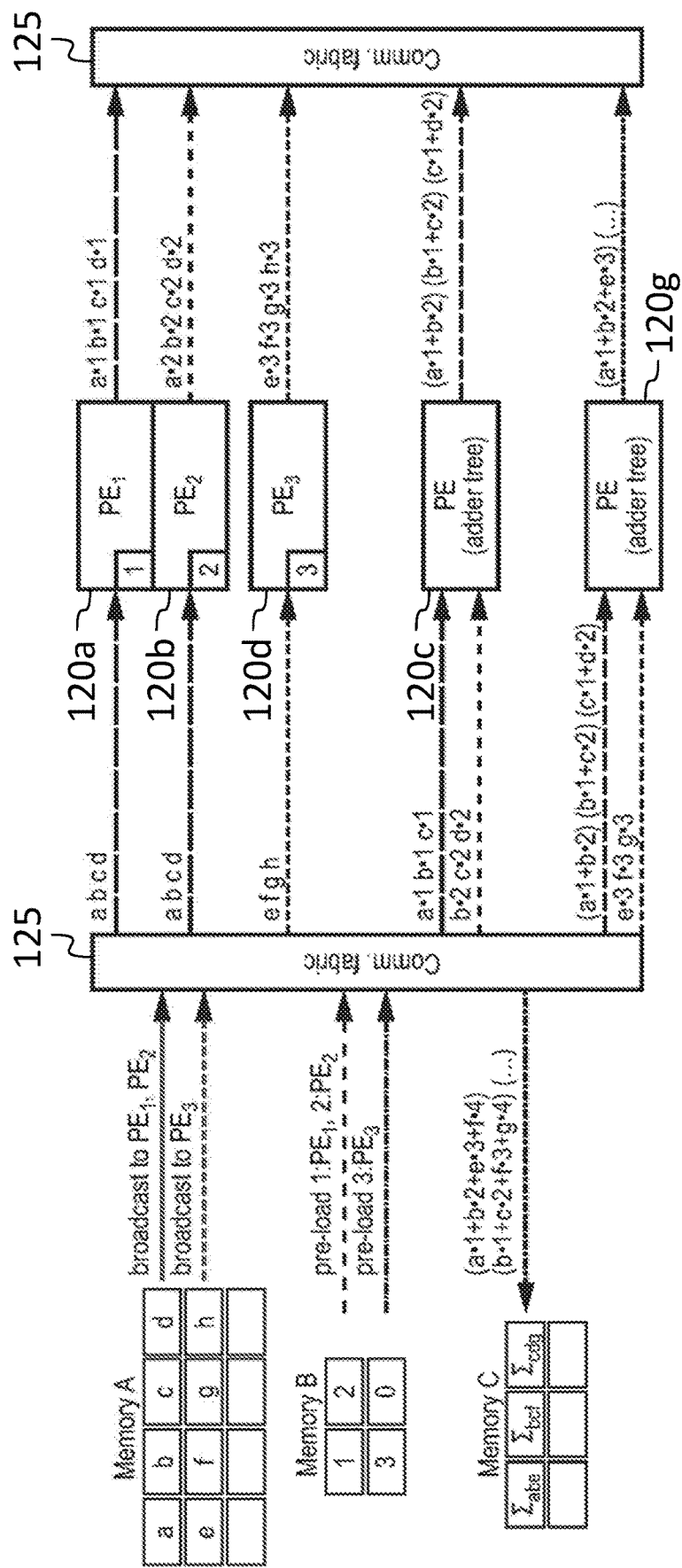
FIG. 2H is a data flow diagram for a calculation, according to an embodiment of the present invention.

FIG. 2H shows how a two dimensional convolution with a sparse constant kernel, e.g., $$C = A * B = \begin{bmatrix} a & b & c & d \\ e & f & g & h \end{bmatrix} * \begin{bmatrix} 1 & 2 \\ 3 & 0 \end{bmatrix} = [(a\cdot 1 + b\cdot 2 + e\cdot 3 + f\cdot 0)$$

$$(b\cdot 1 + c\cdot 2 + f\cdot 3 + g\cdot 0)(c\cdot 1 + d\cdot 2 + g\cdot 3 + h\cdot 0)],$$

may be performed. This convolution differs from that corresponding to FIG. 2G in that the second element of the second row of the constant kernel (which, in the calculation of FIG. 2G, is nonzero and is programmed into the fifth processing element 120e) is zero, and therefore, the fifth processing element 120e, if present, would only multiply by zero. Accordingly, the fifth processing element 120e is absent from the configuration of FIG. 2H. The sixth processing element 120f is also absent. In the embodiment of FIG. 2G, the sixth processing element 120f forms pairwise sums of products of the second row of the input matrix with the second row of the kernel; in the embodiment of FIG. 2H one term of each pair of terms is zero, so that the other term (which is produced by the third processing element 120*c*) is used instead.

Figure 2I:
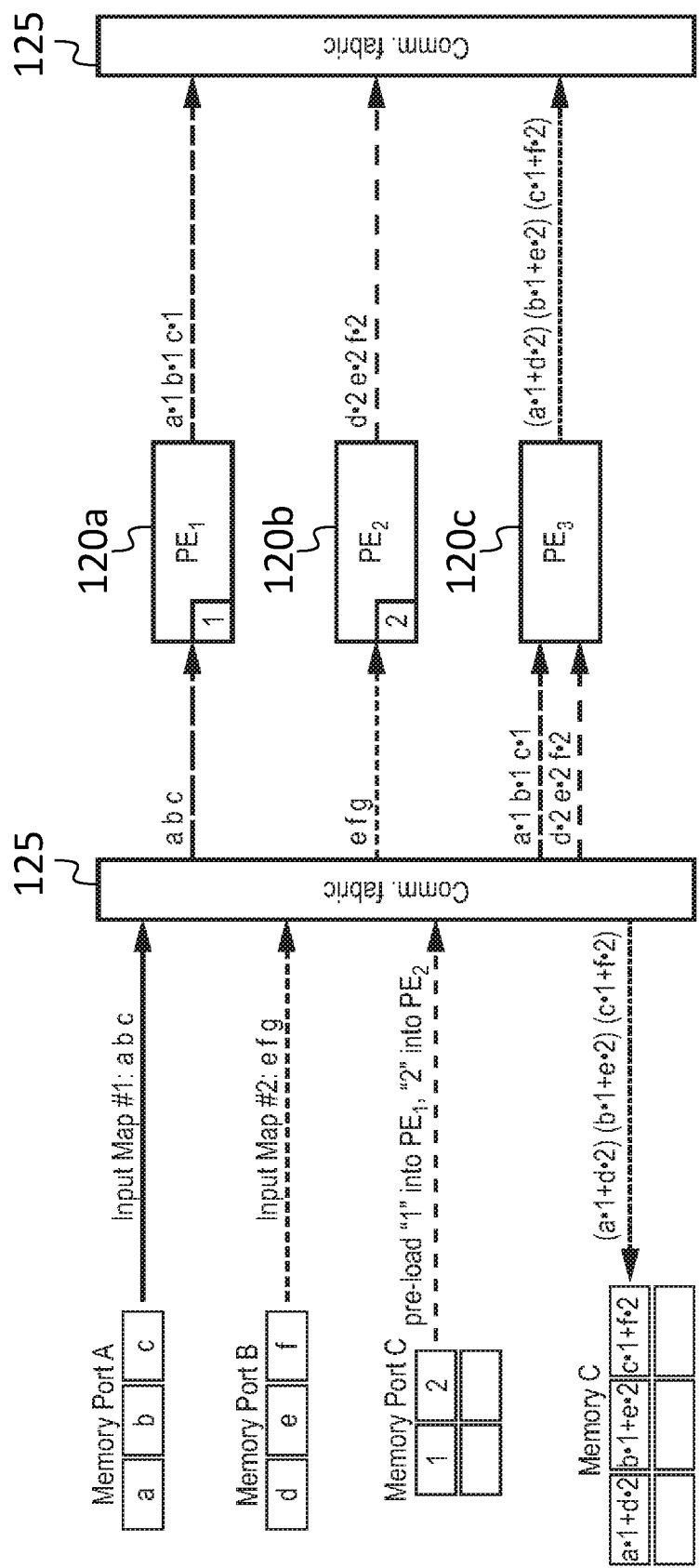
FIG. 2I is a data flow diagram for a calculation, according to an embodiment of the present invention.

FIG. 2I shows how a 1×1 one dimensional convolution, with a constant kernel, e.g., $$C=A*B=[[a\ b\ c],[d\ e\ f]]*[[1\ 2]]=[(a\cdot1+d\cdot2)(b\cdot1+e\cdot2)(c\cdot1+d\cdot2)],$$

may be performed. As in the case of the calculation of FIG. 2F, a first processing element 120*a* and a second processing element 120*b* are pre-loaded to perform multiplications by respective constant terms, and each multiplies each input value it receives by the respective constant. The products are then summed, pair-wise, by a third processing element 120*c*.

FIGS. 3A-3E show examples of how sparse vectors, matrices, and other tensors may be processed in an efficient manner using a "sparse representation" format that may be used to represent one or more zeros within a sequence of numbers. In some embodiments, this is accomplished in the sparse representation by omitting the zero elements, and representing each nonzero number as a 2-tuple, the first element of which is the value, and the second element of which is an address increment. The address increment is 1 if the next element in the conventional, or "dense" representation of the vector is also nonzero, and otherwise it is equal to one plus the number of zeros following the present element. This correspondence is shown for two examples in Table 1. For example, a first vector has four non zero elements [a, b, c, d]. Because none of the elements are zero, the first element of each 2-tuple of the sparse representation of this vector is equal to the value of the corresponding element of the dense representation, and the second element of each 2-tuple is 1. A second vector has four elements, and is written, in the dense representation, as [1, 2, 0, 4], i.e., the third element is zero. In the sparse representation of the second vector, the zero is omitted, so that the sparse representation has only three 2-tuples. The 2-tuple for the value preceding the zero value has an increment of 2, to indicate that a zero, after this element, has been omitted.

TABLE 1

| Dense | Sparse |
|---|---|
| [a, b, c, d] | [{a, 1}, {b, 1}, {c, 1}, {d, 1}] |
| [1, 2, 0, 4] | [{1, 1} {2, 2} {4, 1}] |

Figure 3A:
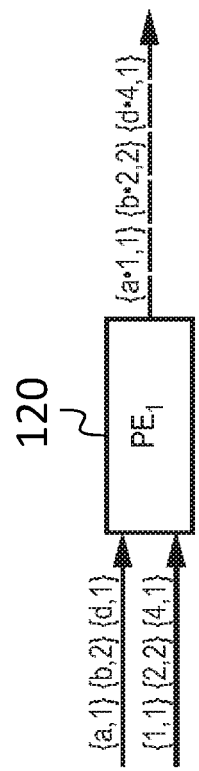
FIG. 3A is a data flow diagram for a calculation, according to an embodiment of the present invention.
Figure 3B:
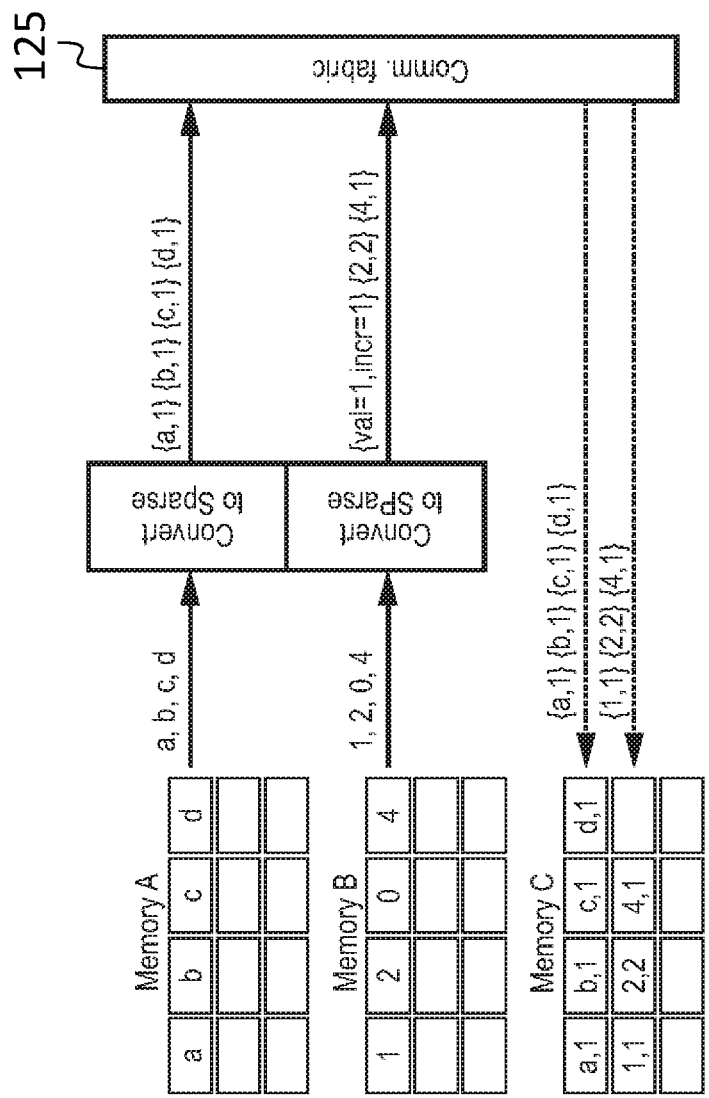
FIG. 3B is a data flow diagram for a calculation, according to an embodiment of the present invention.

FIG. 3A illustrates how the two vectors of Table 1 may be multiplied, when received in sparse format by the processing element 120. At each clock cycle, the second elements of the two 2-tuples received at the two inputs of the processing element 120 have the same value, and that value is used for the second element of the "result 2-tuple" (the 2-tuple that stores the result, the first element of which is equal to the product of the first elements of the input 2-tuples). The processing element 120 is therefore able to calculate the element-wise product of two four-element vectors (both supplied in the sparse representation, and one of which contains one element with a value of zero) in three operations (to form a four-element product vector, represented in the sparse representation, by three 2-tuples).

Figure 3C:
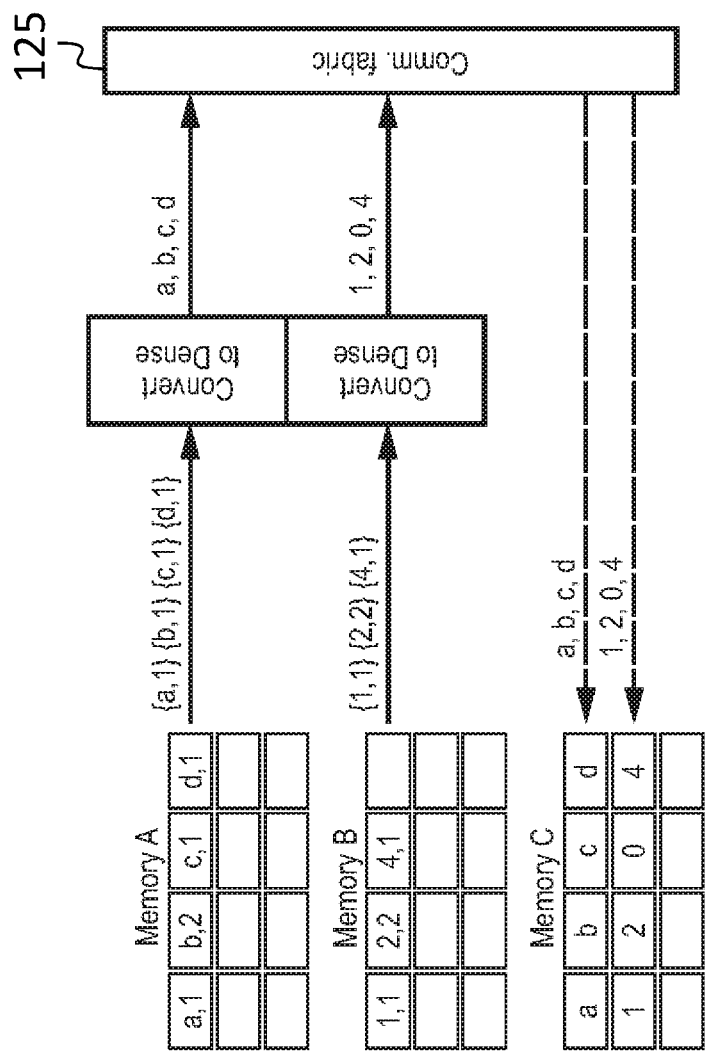
FIG. 3C is a data flow diagram for a calculation, according to an embodiment of the present invention.

Conversion from the dense representation to the sparse representation may be performed by suitable circuits in a memory controller of the scratch memory 115. Conversion to the sparse representation is shown, for one example, in FIG. 3B. The dense representation of a vector [a, b, c, d] is fed out of memory A; because this vector has no zero elements, conversion to the sparse representation has the effect, for this vector, of converting each of elements to a 2-tuple in which the first element is equal to the corresponding element of the dense representation of the vector, and the second element (the address increment) is equal to 1. The vector [1, 2, 0, 4] is fed out of memory B; because this vector has a zero element in the third position, the second 2-tuple has a second element (the address increment) equal to 2, to signal that a zero element has been deleted following the second element. The results of the conversion to the sparse representation may be saved in another memory, memory C, as shown. Conversion from the sparse representation to the dense representation may be performed by suitable circuits in the memory controller of the scratch memory 115, in an analogous manner, as illustrated in FIG. 3C. The sparse representation, {a, 1} {b, 1} {c, 1} {d, 1} of the vector [a, b, c, d] is fed out of memory A; because this vector has no zero elements (and, therefore, each address increment is one), conversion to the dense representation has the effect, for this vector, of converting each 2-tuple of elements to an element in the dense representation, the element of the dense representation being equal to the first element of the corresponding 2-tuple. The sparse representation, {1, 1} {2, 2} {4, 1} of the vector [1, 2, 0, 4] is fed out of memory B; because this vector has an address increment of 2 in the second element of the second 2-tuple, the second 2-tuple is expanded to form two elements (2 and 0) of the dense representation; for each of the other two 2-tuples the address increment is one and therefore the first element of the 2-tuple becomes the value of the corresponding element of the dense representation of the vector, which is [1, 2, 0, 4]. The results of the conversion to the dense representation may be saved in another memory, memory C, as shown.

Figure 3D:
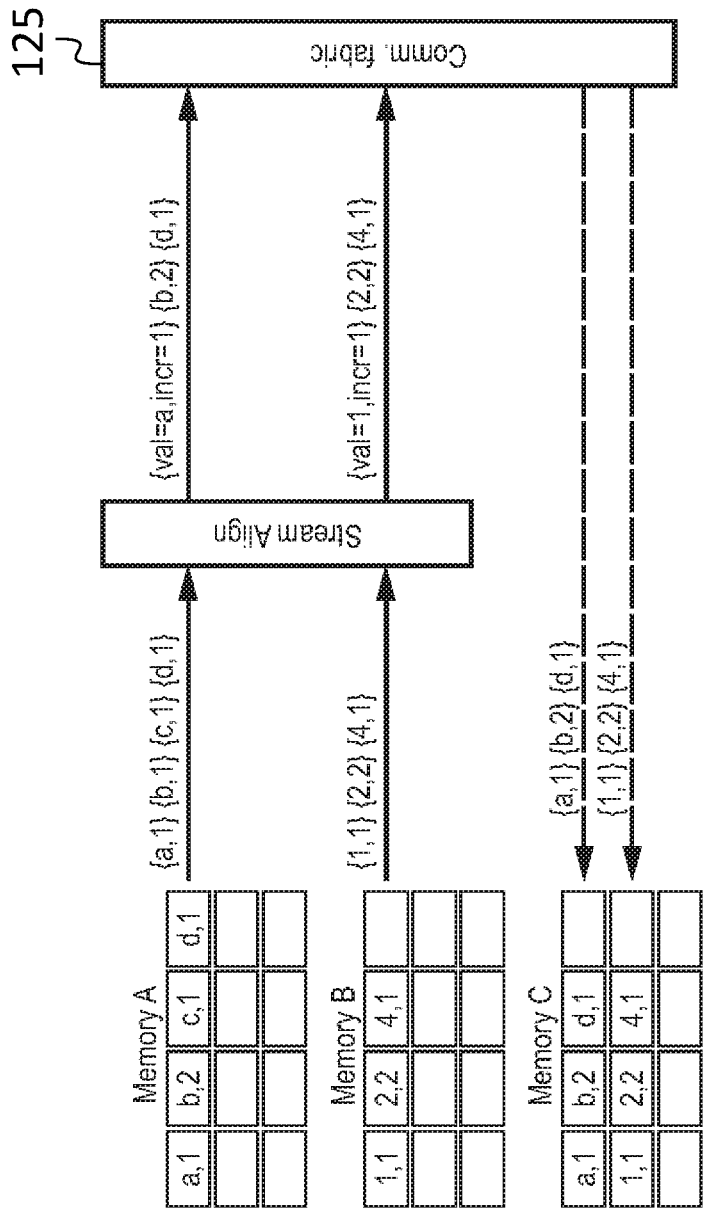
FIG. 3D is a data flow diagram for a calculation, according to an embodiment of the present invention.

A stream align preprocessing step illustrated in FIG. 3D, may be used to align the elements of two vectors in sparse representation before performing an operation. If the operation is multiplication (e.g., element-wise multiplication or a dot product), then each nonzero element of either vector for which the other vector has a zero value may be deleted, or, equivalently, the 2-tuple may be removed and the address increment of the preceding 2-tuple incremented by 1. In the example of FIG. 3D, the stream align step has the effect of deleting the third 2-tuple from the first vector, and incrementing the address increment of the preceding 2-tuple by one (from {b, 1} to {b, 2}). If the operation to be performed is addition or subtraction, then each missing 2-tuple in either vector for which the other vector has a non-missing 2-tuple may be reinstated with a first 2-tuple element of 0 (and the address increment of the 2-tuple preceding the reinstated 2-tuple may be decremented by one).

Figure 3E:
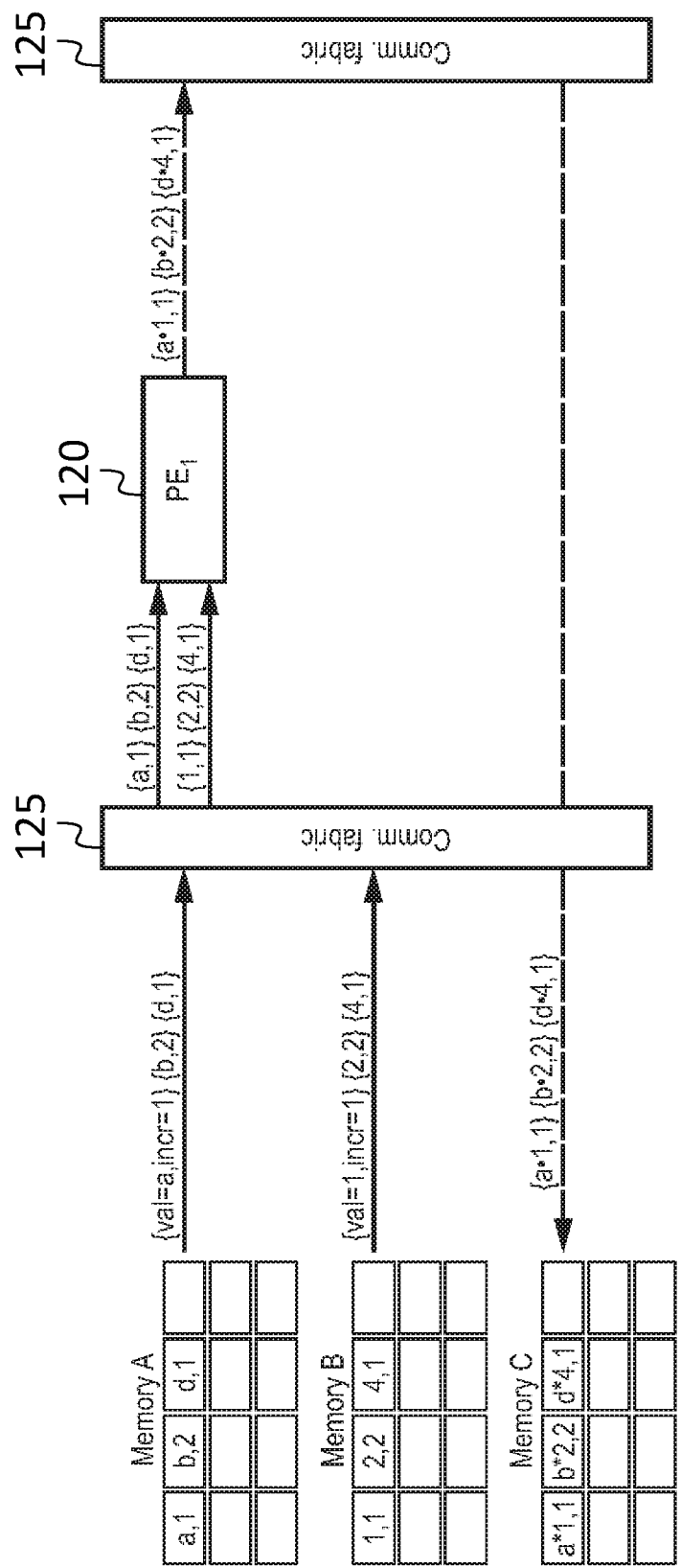
FIG. 3E is a data flow diagram for a calculation, according to an embodiment of the present invention.

FIG. 3E illustrates element-wise multiplication performed on two stream-aligned vectors in sparse representation. The processing element 120 (i) performs the operation (multiplication) on the first elements of each pair of 2-tuples received, to form the first element of the corresponding result 2-tuple, and (ii) copies the address increment (which, as a result of the stream align process, is the same for both input 2-tuples) to the address increment element of the result 2-tuple.

Figure 4A:
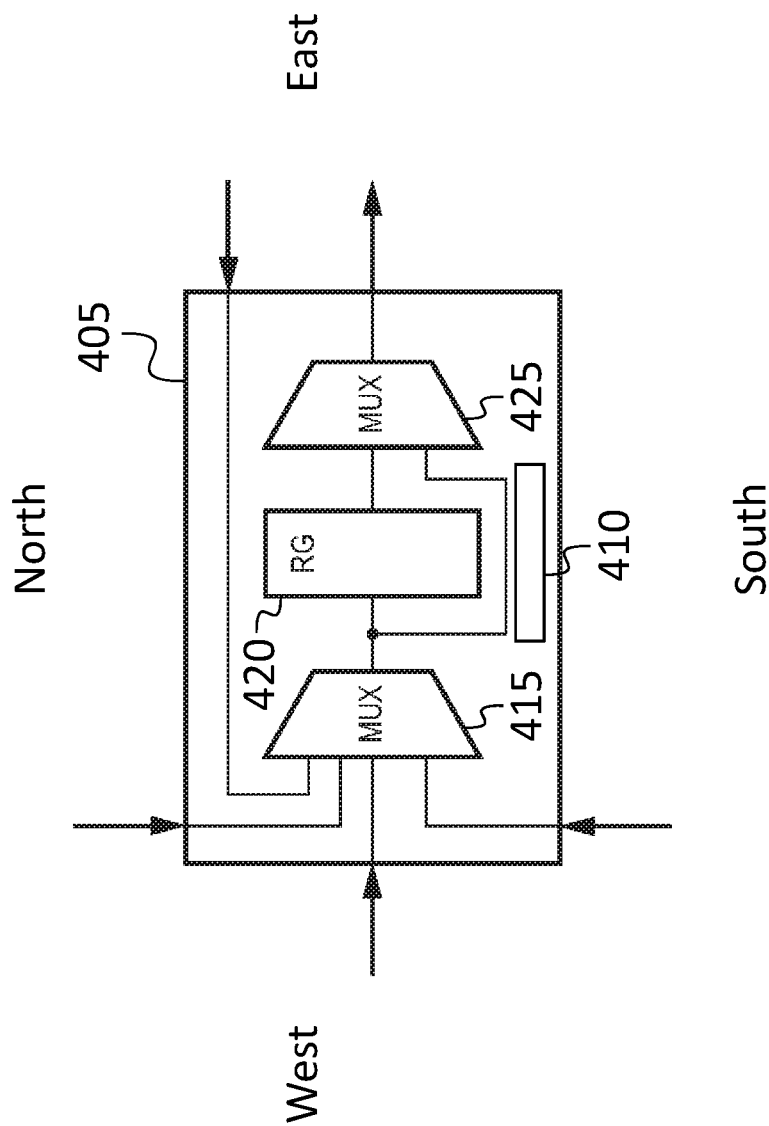
FIG. 4A is a block diagram of a node link, according to an embodiment of the present invention.

The communication fabric 125 may include a plurality of nodes, or "node circuits" each including four node links, or "node link circuits". Each node may have four inputs from four substantially orthogonal directions referred to herein as north, south, east, and west, and four outputs in the same directions. FIG. 4A shows a node link, 405, in one embodiment. The node link also has four inputs, connected respectively to the four inputs of the node, and one output, which is connected to one of the four outputs of the node. Each node link has a configuration register 410, the contents of which control which input is connected to the output, whether to delay the received data in the node link, or whether to store the most recently received data as a constant. The node link also includes a four-input multiplexer (MUX) 415, a data register 420, and a two-input multiplexer 425. Two bits of the configuration register may control the four-input multiplexer 415, which selects which of the four inputs are to be connected to the output of the node link 405. One bit of the configuration register may control a clock enable input of the data register 420, so that (with the clock disabled) it may be used to store a constant (stored in the last cycle during which the clock input was enabled). The setting of the two-input multiplexer 425 (which is controlled by one bit of the configuration register 410) determines whether the output of the node link is the value at the output of the four-input multiplexer 415, or the (constant or delayed) value stored in the data register 420. In some embodiments, each node link includes an additional register at the output (i.e., each output is registered).

Figure 4B:
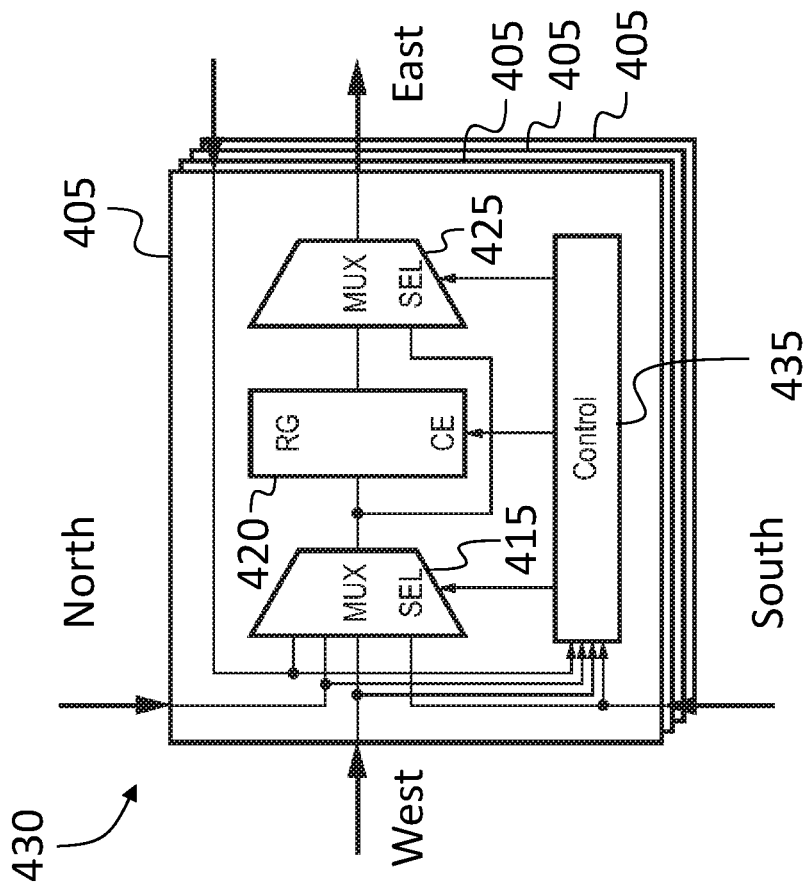
FIG. 4B is a block diagram of a node, according to an embodiment of the present invention.
Figure 4C:
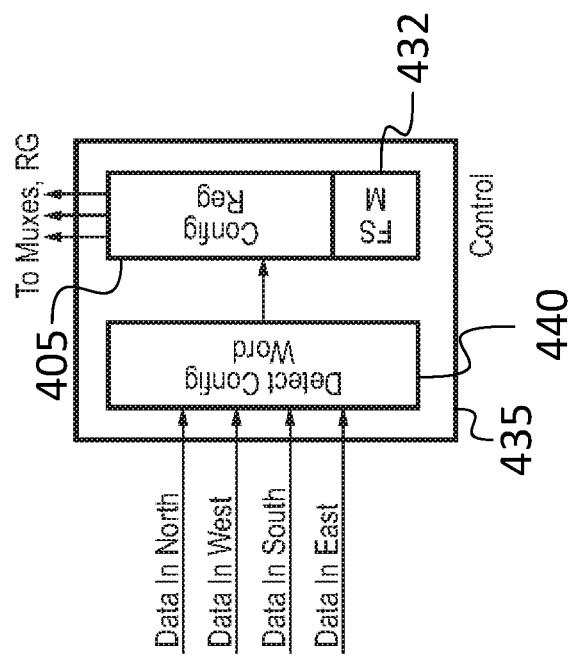
FIG. 4C is a block diagram of a control circuit, according to an embodiment of the present invention.

FIG. 4B shows a node 430 of the communication fabric 125. The node includes four node links 405, as described above. Each node link 405 includes a control circuit 435 (not shown in FIG. 4A). The control circuit 435 is shown in FIG. 4C; it includes a finite state machine ("FSM") 432, a configuration word detection circuit 440 that detects when a configuration word is received at any of the four inputs (as described in further detail below), and, when this occurs, it writes a new value to the configuration register 410.

Figure 5A:
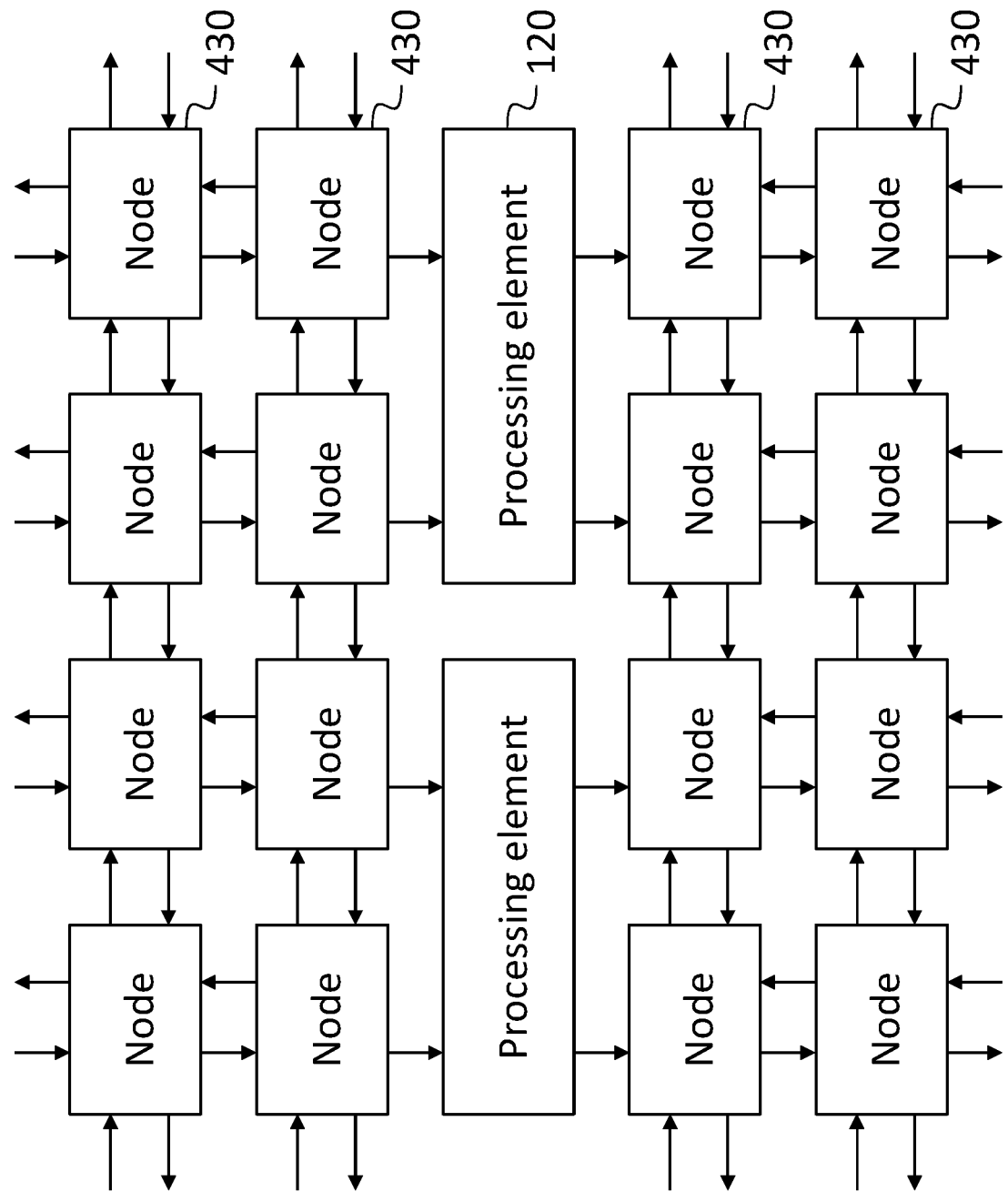
FIG. 5A is a block diagram of a portion of a system for calculating, according to an embodiment of the present invention.

The nodes and processing elements may form a mesh such as that of FIG. 5A, with the connections shown as extending off of the edge of the drawing being connected to, for example, additional nodes 430, additional processing elements, or scratch memories 115. Each processing element 120 may have two outputs as shown; the second output may be of use, for example, if the processing element 120 is configured to receive two input values and output, at the two outputs, the larger one of the two input values and the smaller one of the two input values, respectively.

Figure 5B:
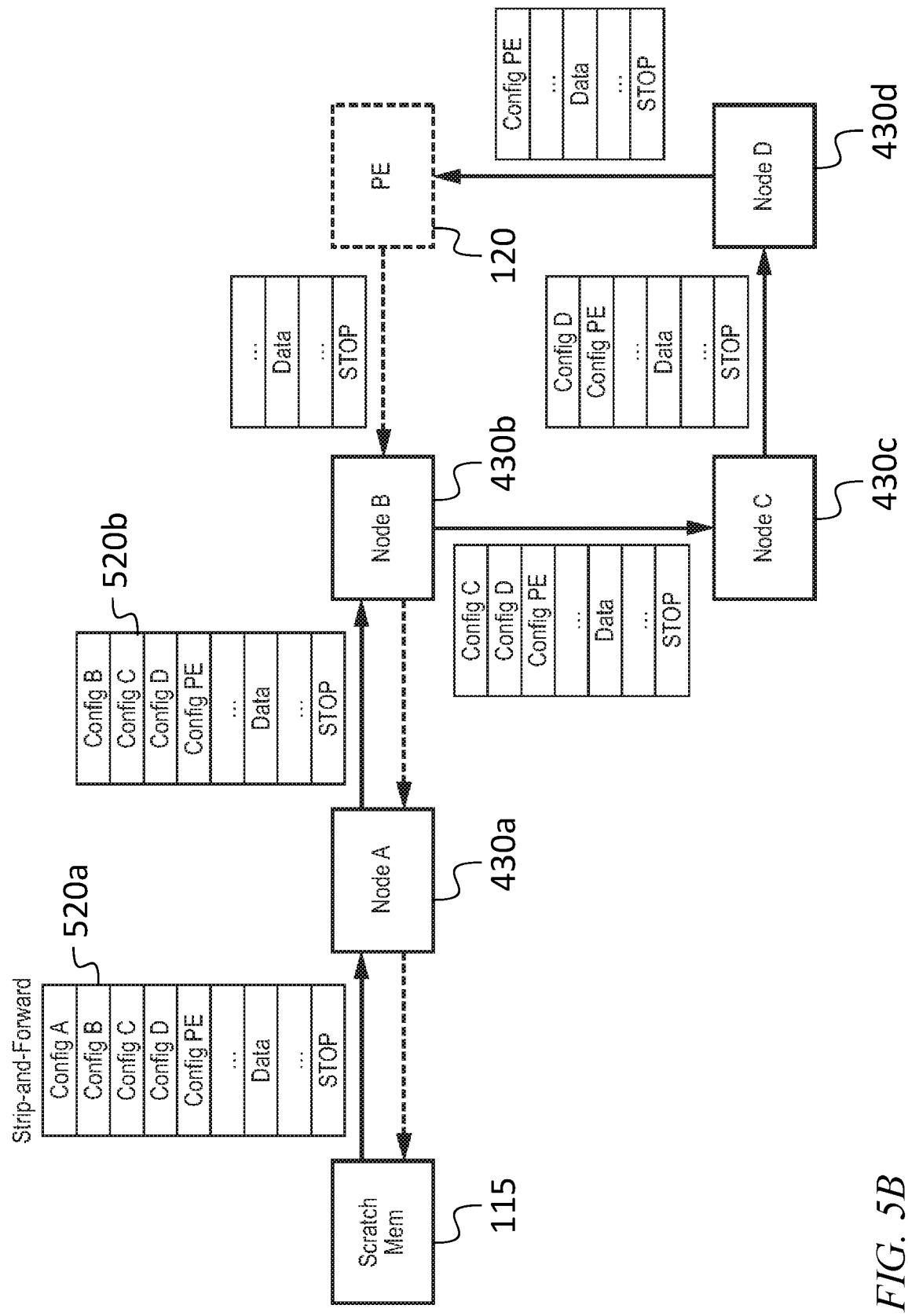
FIG. 5B is a data flow diagram for reconfiguration operation, according to an embodiment of the present invention.

In operation, the data transferred between the scratch memory 115, the nodes 430 and the processing elements 120, may be in the form of data words, e.g., 20-bit wide words each having a 4 bit wide control portion and a 16 bit wide data portion. FIG. 5B shows an example of how the communication fabric 125 may be configured, i.e., how the configuration registers 410 in the node links 405 may be programmed. One of the scratch memories 115 may send out a sequence 520a of node configuration words, each being recognizable by the node links 405 as a result, for example, of having the binary value 0000 in the first four bits, as described in further detail below, with reference to Table 2. The first configuration command of the sequence 520 may be recognized by a node link of a first node 430a, (i) as being a node configuration command (as a result of the first four bits being 0000), and (ii) as being addressed to the node link (as a result of the subsequent 8 bits being equal to a unique 8-bit identifier stored in the node link). The node link may then send a no operation (NOP) data word to its output of the first node 430a, and inform the other node links of the first node 430a that the currently received data word is to be suppressed. Each of the other node links of the first node 430a, then also sends a no operation (NOP) data word to its respective output of the first node 430a. The second and subsequent data words of the sequence 520a of node configuration words (i.e., the reduced sequence 520b of node configuration words may then be forwarded, by the first node 430a to the second node 430b. A data word that is identified by its control portion as containing configuration data for a node link 405 may be referred to as a "node link configuration word", and a data word that is identified by its control portion as containing configuration data for a processing element 120 may be referred to as a "processing element configuration word".

In this manner, referred to as "strip and forward" programming, all of the nodes 430 may be programmed, each node, once programmed, forwarding further configuration information and data according to its currently programmed state. The processing elements 120, of which one is shown in the exemplary programming data path of FIG. 5B, are programmed in a similar manner.

Referring to Table 2, as mentioned above, each data word may have a width of 20 bits, of which the first four bits are control bits, and the remaining 16 bits are data bits. Any data word having a control word equal to binary 0000 (except the NOP word, consisting entirely of zeros) is a node link configuration word, and is processed as described above. Any data word having a control word equal to binary 0001 is a processing element configuration word, and is processed in a similar manner by the processing element 120 that receives it, i.e., when the processing element 120 receives such a data word, it saves the data bits of the data word in its control register 122. The STOP word, which has a control portion equal to binary 0011, causes the processing element 120 that receives it to clear its accumulator, and to stop processing data until it receives another processing element configuration word. The STOP word may be used to terminate multiply and accumulate operations in the processing element 120.

In some embodiments, data words with control portions greater than binary 0111 are used to encode a 2-tuple of a vector in the sparse representation, with the control portion being the address increment, plus 7 (i.e., a control word value of binary 1000 represents an address increment of 1).

TABLE 2

| | Control | Data | Notes |
|---|---|---|---|
| Data | 0100 . . . 1111 | dddd dddd dddd dddd | Ctrl 8: mul out; 9: add out; A: mac |
| NOP | 0000 | 0000 0000 0000 0000 | |
| STOP | 0011 | 0000 0000 0000 0000 | Stream finished (gen by memctrl) |
| Config comm node | 0000 | nnnn nnnn edoo iiii | nnnnnnnn: node link ID<br>e = enable config<br>d = enable delay<br>oo: output (UDRL)<br>iiii: input mux sel (UDRL) |
| Config PE node | 0001 | 01dd eeaa oooo oooo (10xr xxxx llll llll 11xr xxxx hhhh hhhh) | o = operation x+−<br>etc. 1: mul, 2: add,<br>3: sub, 4: mac<br>aa = accumulate<br>r = load register<br>e = enable register<br>l = low 8 bits, h = high 8 bits dd = datatype (fp, unit, etc) |

Figure 6A:
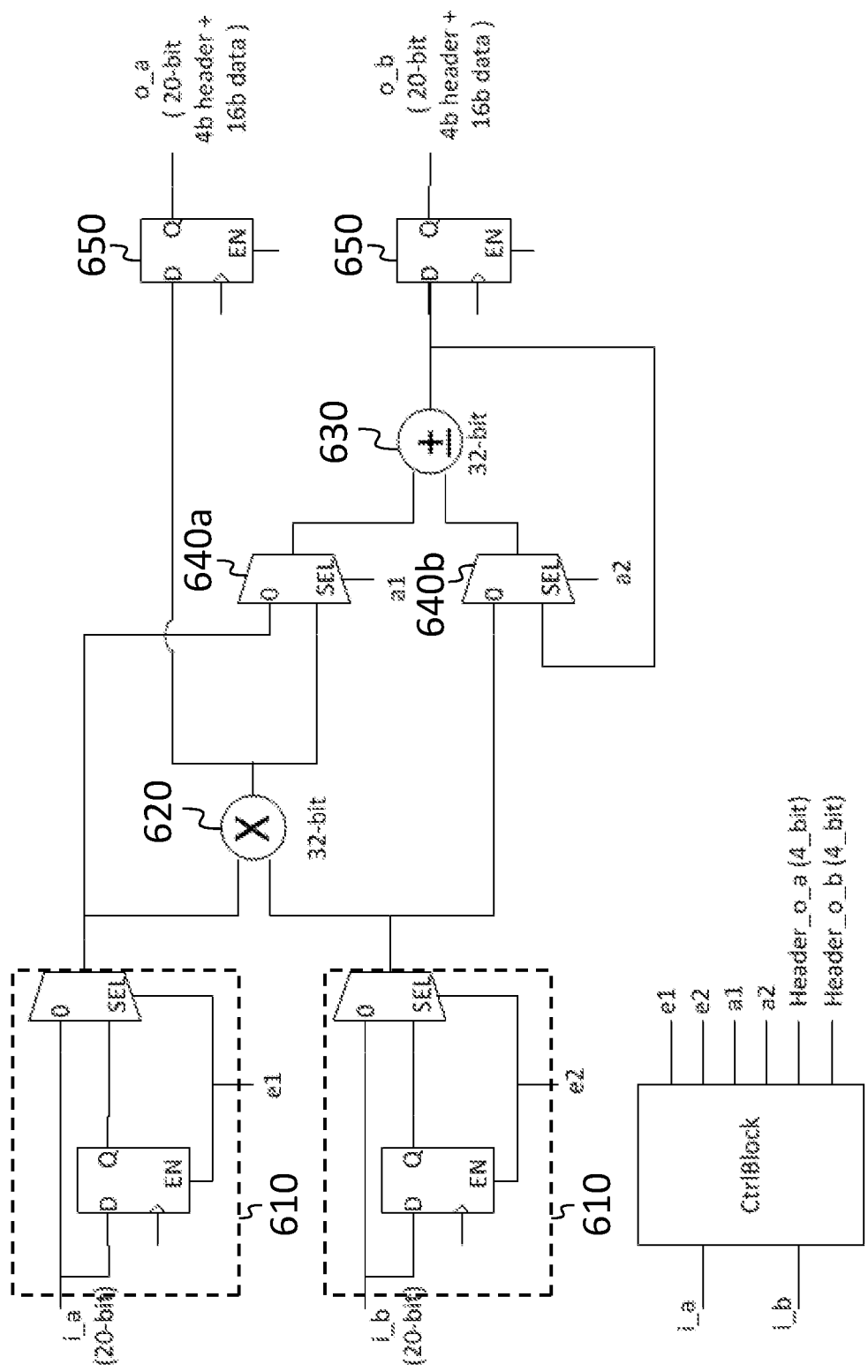
FIG. 6A is a block diagram of a processing element, according to an embodiment of the present invention.

FIG. 6A is a schematic diagram of a processing element 120, in some embodiments. A respective input circuit 610, including a respective register and multiplexer, is connected to each of the inputs, and may be used to (i) feed the input value through unchanged, (ii) delay the input value by one clock cycle, or (iii) store a constant value to be used in a plurality of subsequent calculations. A multiplier 620 forms products of the values supplied by the input circuits 610, and an adder 630 forms sums of pairs of values. A first data switching multiplexer 640a determines whether the adder 630 receives at its first input the output of the multiplier 620, or the output of the first one of the input circuits 610. A second data switching multiplexer 640b determines whether the adder 630 performs pairwise sums or acts as an accumulator. The processing element 120 further includes two output registers 650.

Figure 6B:
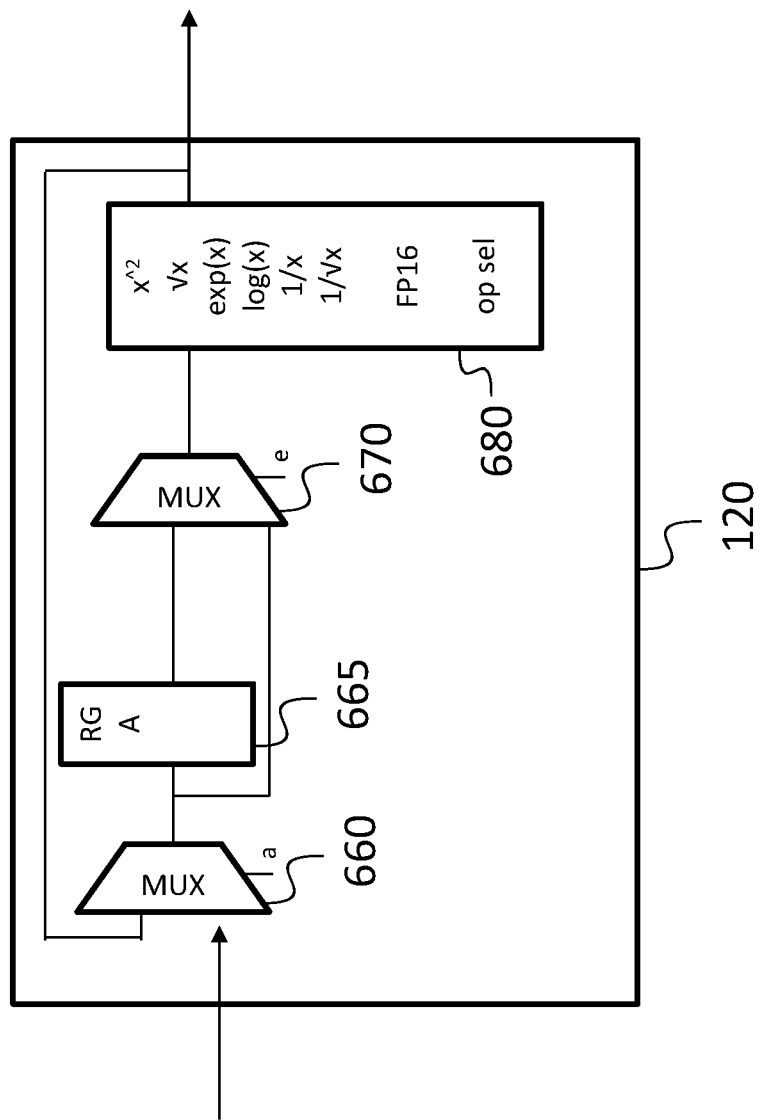
FIG. 6B is a block diagram of a processing element, according to an embodiment of the present invention.

FIG. 6B is a block diagram of a processing element 120 according to another embodiment. Different types of processing elements 120 may be combined in a processing module 110 (FIG. 1) or any one processing element 120 may combine features of several types of processing elements, such as those of FIGS. 6A and 6B. The processing element 120 of FIG. 6B includes a first multiplexer 660, which determines whether newly received data or data from the output are used for a calculation, a first register 665 and a second multiplexer 670, which together select whether the data are delayed by one clock cycle, and a math circuit 680 which may be capable of various mathematical operations such as those shown (e.g., the calculation of a square, a square root, a reciprocal, or a logarithm). In some embodiments, other special-purpose processing elements may be present, including, for example, a processing element configured to perform division.

Processing elements 120 may further be configured to perform operations on a variety of data types including floating point (FP) signed integer (int) unsigned integer (uint), and boolean, and to perform casting operations between the data types. Examples of such operations include multiply (FP16, FP16), (u/int8/16, u/int8/16), add (FP16, FP16), (u/int8/16, u/int8/16), subtract (FP16, FP16), (u/int8/16, u/int8/16), negate (FP16, FP16), (u/int8/16, u/int8/16), cast FP16 to int16/uint16/int8/uint8, cast int16/uint16/int8/uint8 to FP16, cast FP16 to boolean, cast boolean to FP16, max(FP16, FP16), min(FP16, FP16), greater (FP16, FP16)–>boolean, less, equal, greater-or-equal, less-or-equal, logical and, or, negate, xor booleans, bitwise and, or, negate, xor int8/16,uint8/16, shift left/right arith/circular, ints, uints, and isNaN(FP16)–>boolean, isInf(FP16). In the notation used in this paragraph, the oblique "/" signifies "or" so that, for example, u/int8/16 means uint8, uint16, int8, or int16.

In some embodiments both the nodes 430 and the processing element 120 are small, i.e., they require few gates to construct; accordingly, the cost per unit processing power may be low, and a system including a plurality of processing modules 110 (FIG. 1) may be scaled up to provide a significant amount of total processing power, at a relatively low cost. The cost may be relatively low both in terms of the cost to construct the system, and in terms of operating cost (e.g. power consumption, and space required), because of the relatively small sizes of the nodes 430 and the processing element 120. In some embodiments each node link 405 includes 500 or fewer gates, and each processing element 120 includes 5,000 or fewer gates.

FIGS. 7A-7E illustrate the structure and organization of the scratch memory 115, which includes a memory controller 710 and a memory bank 720. The memory bank 720 may be a two-port memory e.g., a static random access memory (SRAM). The memory controller 710 may (i) copy data between the memory bank 720 and a plurality of row caches, to cause the scratch memory 115 to operate as a memory system with a large number (e.g., tens) of ports, and (ii) perform pre-processing and post-processing operations on the data, such as converting between dense representation and sparse representation, and performing stream alignment.

Figure 7A:
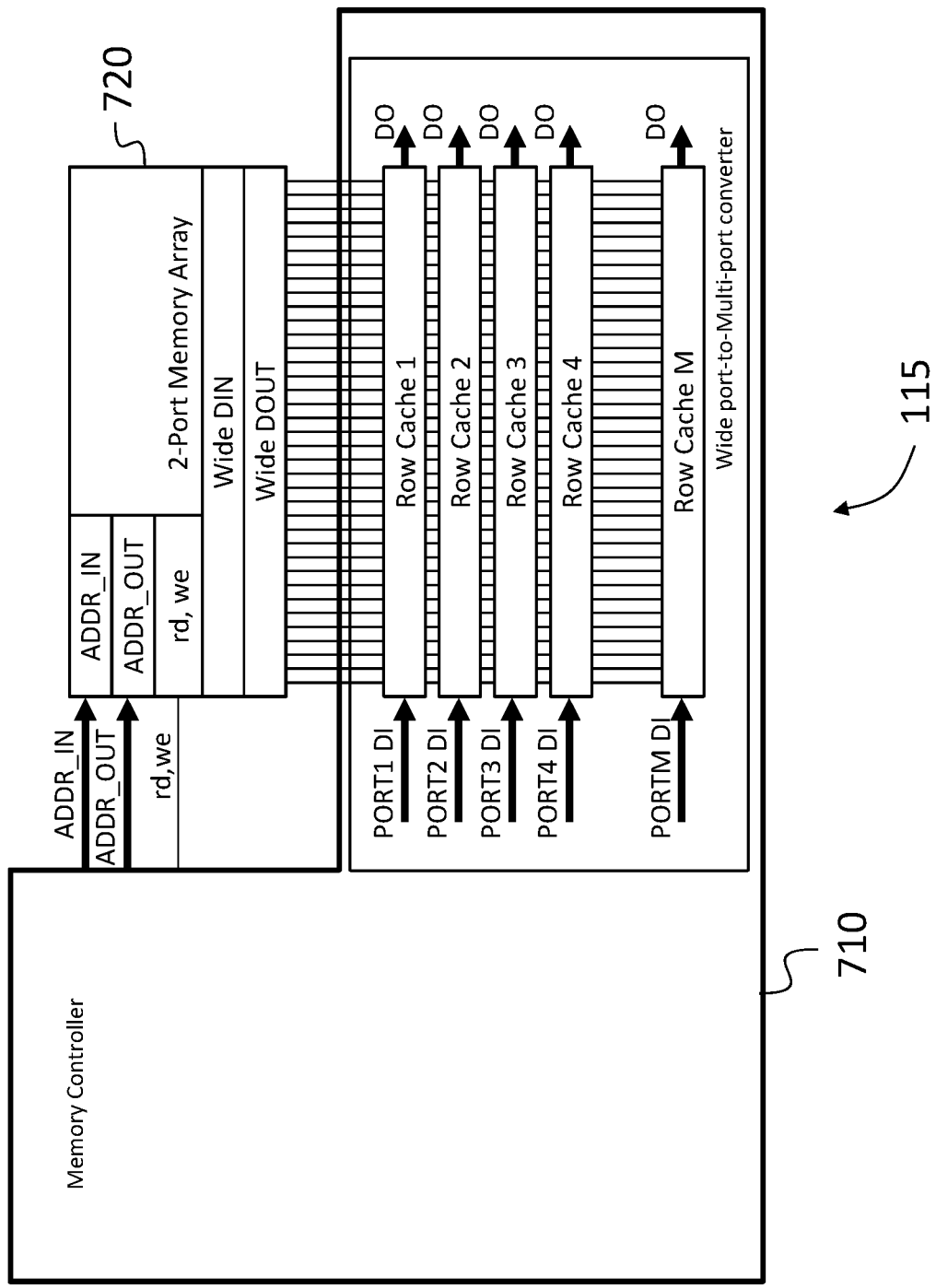
FIG. 7A is a block diagram of a scratch memory, according to an embodiment of the present invention.
Figure 7B:
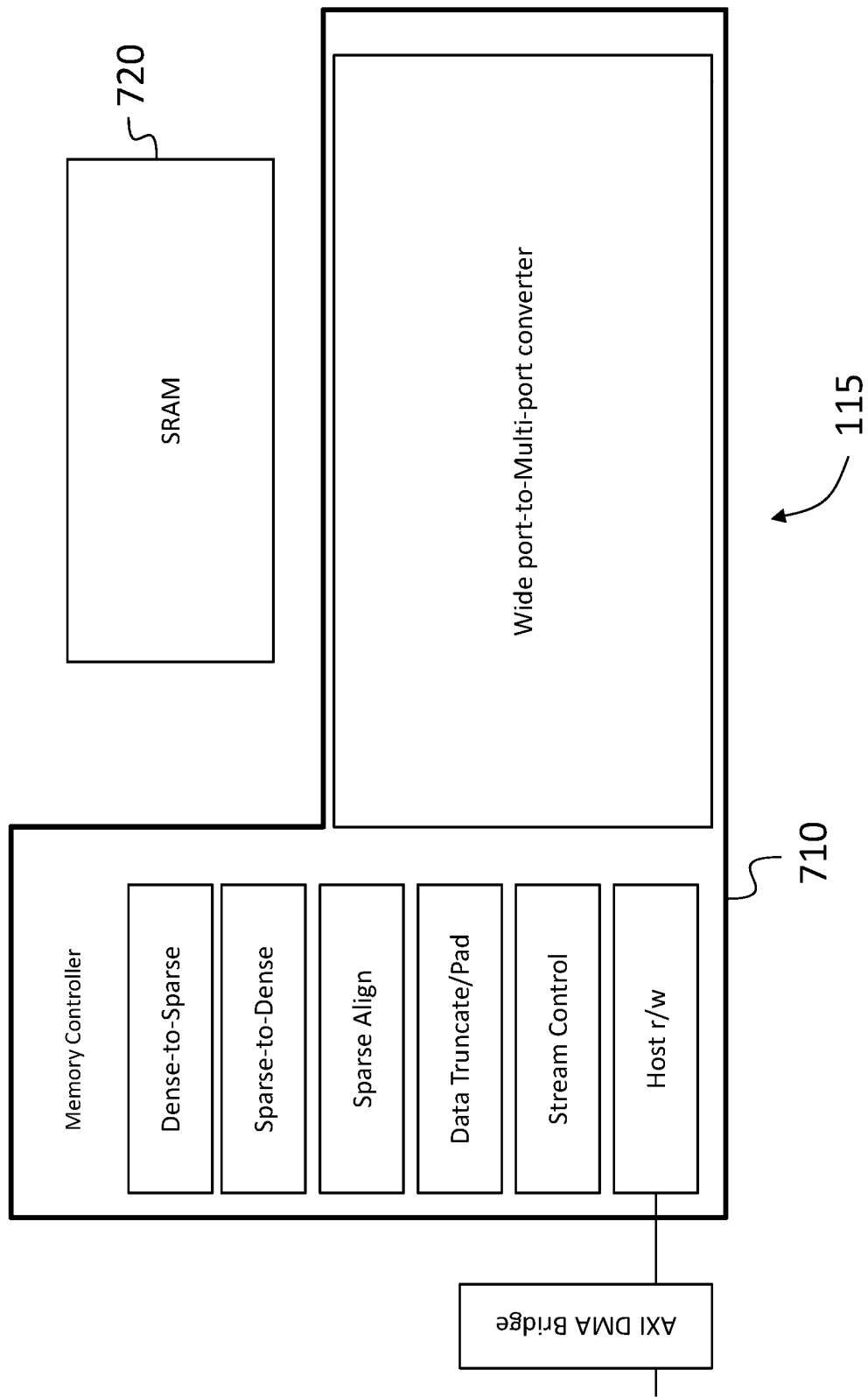
FIG. 7B is a block diagram of a scratch memory, according to an embodiment of the present invention.
Figure 7C:
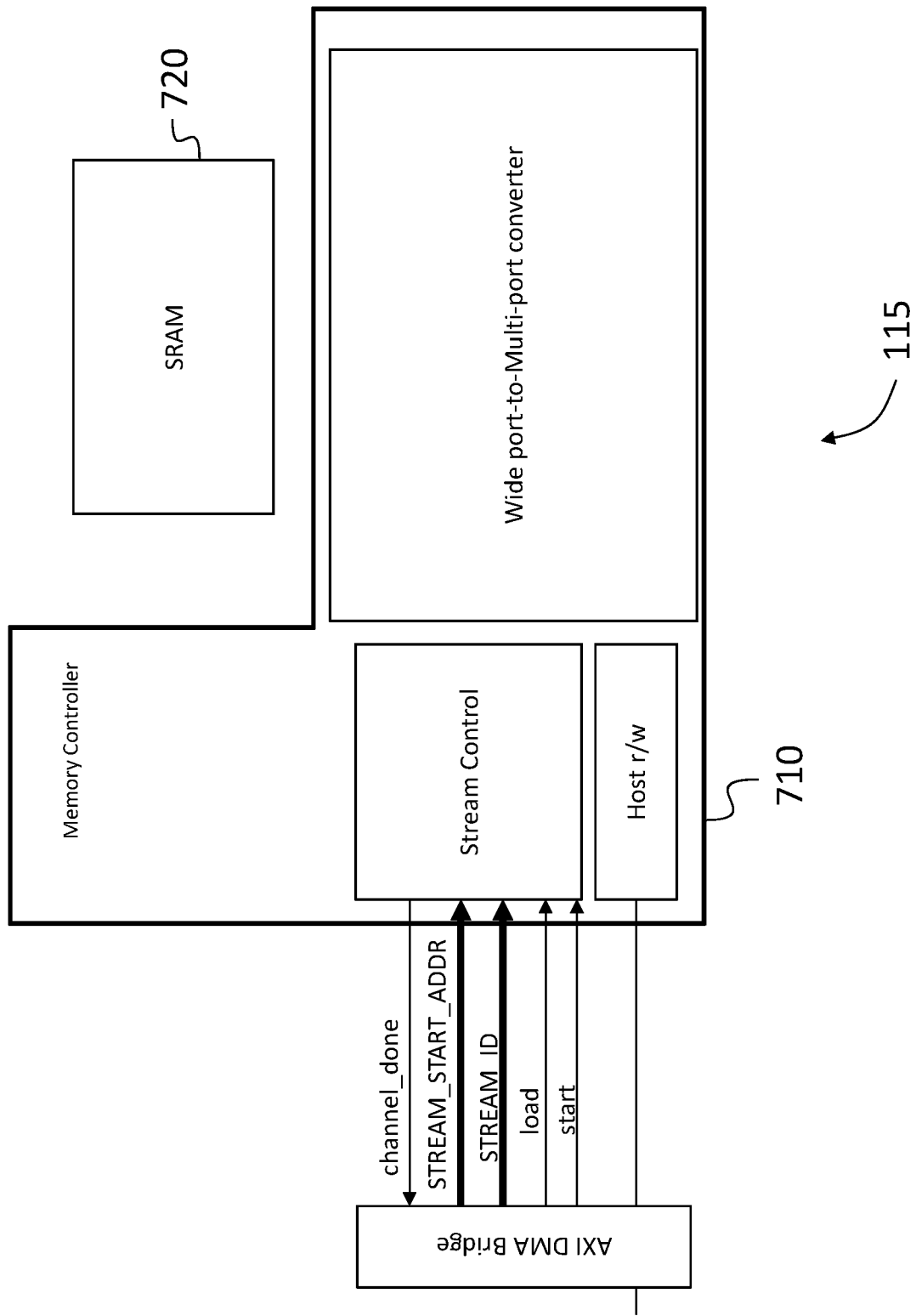
FIG. 7C is a block diagram of a scratch memory, according to an embodiment of the present invention.
Figure 7D:
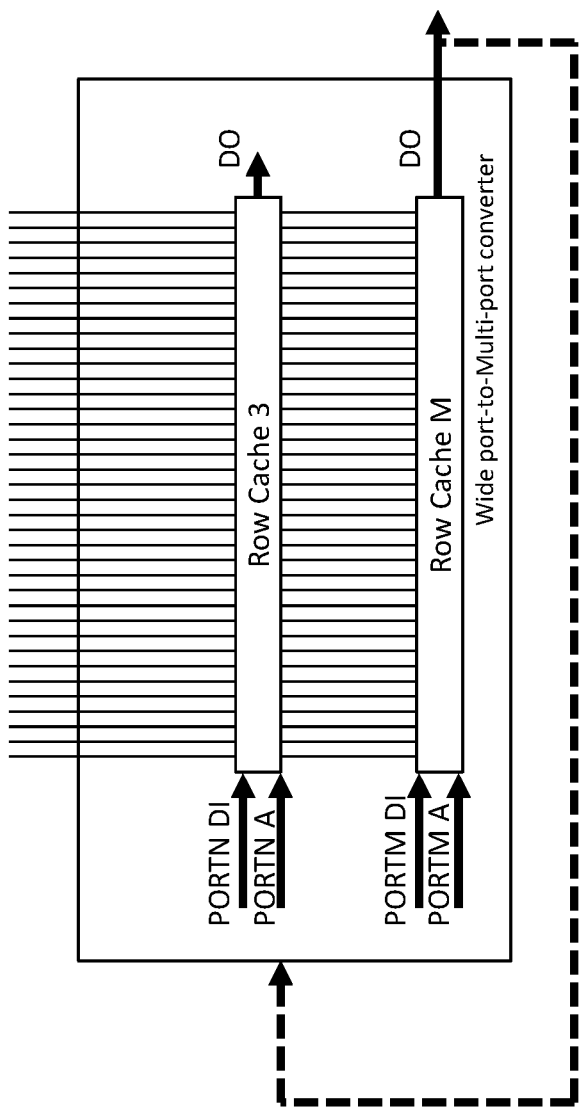
FIG. 7D is a block diagram of a scratch memory, according to an embodiment of the present invention.
Figure 7E:
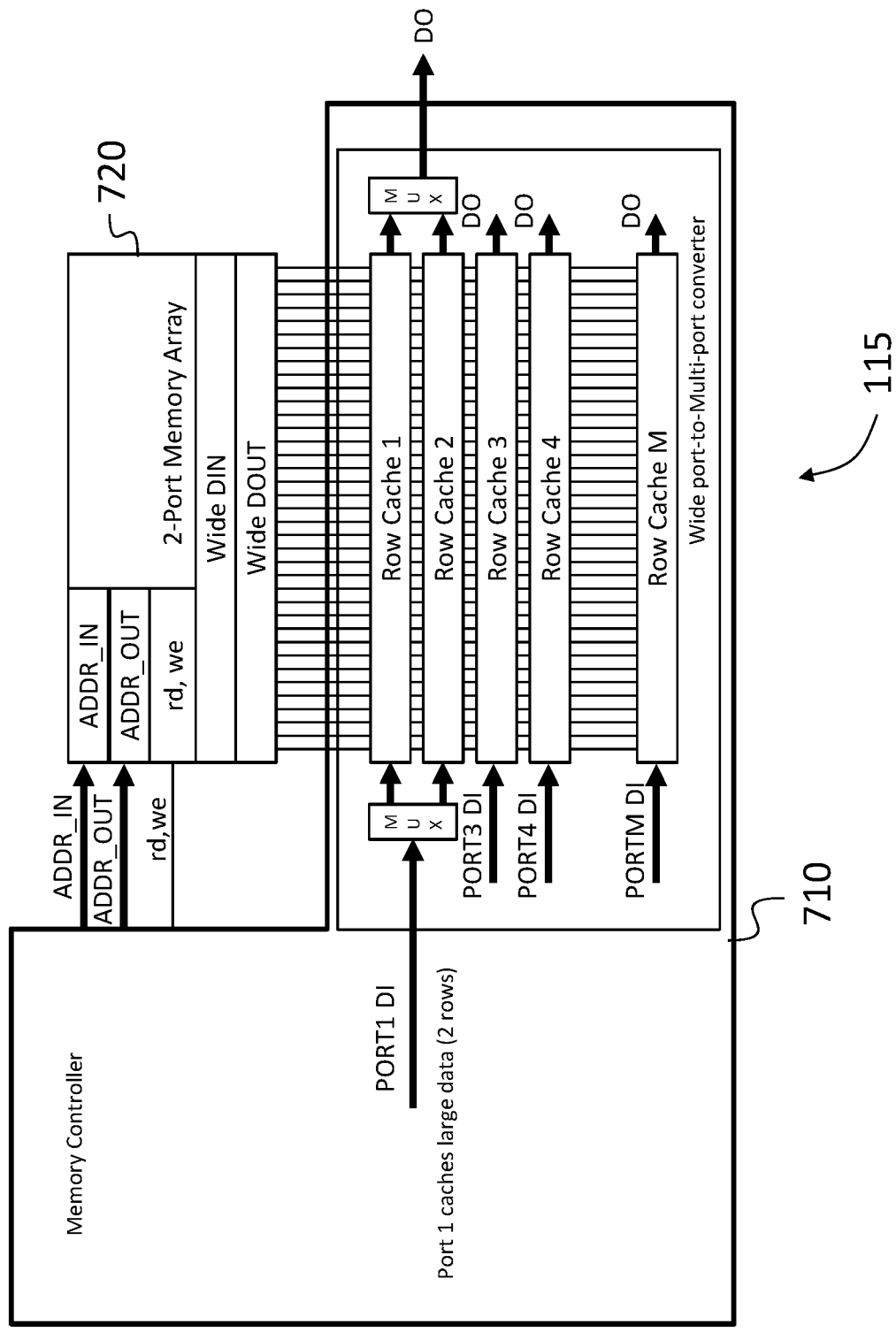
FIG. 7E is a block diagram of a scratch memory, according to an embodiment of the present invention.

Each row cache may be implemented as a double buffer, as shown in FIG. 7E. The memory bank 720 may be accessed via direct memory access (DMA) through an Advanced eXtensible Interface (AXI) bridge connecting the scratch memory 115 to a host central processing unit (CPU). The host CPU may, in operation, program the memory bank 720, and then issue a start command to the memory controller 710, which may then begin streaming data out to the communication fabric 125, first to configure the nodes 430 of the communication fabric 125 and the processing elements 120, and second to perform calculations. In some embodiments, the SRAM is paired with cache. Data is accessed in a streaming fashion, which involves reading values one after another from SRAM. Reading and writing to and from SRAM may be relatively expensive in terms of power; data may therefore be copied into a cache line and streamed from that line, to save power. The cache may be statically scheduled.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a neural processing accelerator have been specifically described and illustrated herein, many modifications and variations will be apparent to those skilled in the art. Accordingly, it is to be understood that a neural processing accelerator constructed according to principles of this invention may be embodied other than as specifically described herein. The invention is also defined in the following claims, and equivalents thereof.

What is claimed is:

1. A system for calculating, the system comprising:
   a plurality of processing element circuits;
   a communication fabric comprising a plurality of node circuits; and
   a scratch memory,
   the scratch memory being connected to the processing element circuits through the communication fabric,
   one or more of the processing element circuits comprising a control register configured to store a configuration value,
   one or more of the processing element circuits being configured:
      to receive, at two inputs, two respective data words, each of the two data words having a control portion and a data portion, and:
         when one of the two data words has a control portion identifying it as a processing element configuration word, to store the data portion of the processing element configuration word in the control register; and
         when neither of the two data words is a processing element configuration word, to perform an operation on the two data words, in accordance with the configuration value.

2. The system of claim 1, wherein the performing of the operation comprises:
   when the configuration value specifies an element-wise multiplication, multiplying the data portion of a first data word of the two data words by the data portion of a second data word of the two data words.

3. The system of claim 1, wherein the performing of the operation comprises:
   when the configuration value specifies an element-wise addition, adding the data portion of a first data word of the two data words to the data portion of a second data word of the two data words.

4. The system of claim 1, wherein the performing of the operation comprises:
   when the configuration value specifies multiplication and accumulation:
      forming a product by multiplying the data portion of a first data word of the two data words by the data portion of a second data word of the two data words, and
      adding the product to an accumulator value.

5. The system of claim 1, wherein one of the processing element circuits includes 5,000 or fewer gates.

6. The system of claim 1, wherein one of the node circuits includes 2,000 or fewer gates.

7. A system for calculating, the system comprising:
   a plurality of processing element circuits;
   a communication fabric comprising a plurality of node circuits; and
   a scratch memory,
   the scratch memory being connected to the processing element circuits through the communication fabric,
   one or more of the of the node circuits comprising a plurality of node link circuits,
   a first node link circuit of the plurality of node link circuits of a first node circuit of the plurality of node circuits having a plurality of inputs and an output, and comprising:
      a data register, and
      a configuration register configured to store a configuration value,
   the first node link circuit being configured to receive, at the inputs, a plurality of respective data words, each of the data words having a control portion and a data portion, and:
      when one of the data words has a control portion identifying it as a node link configuration word, to store the data portion of the node link configuration word in the configuration register; and
      when none of the data words is a node link configuration word:
         to send a data word from one of the inputs to the data register, and/or
         to send a data word from one of the inputs to the output, and/or
         to send a data word from the data register to the output, depending on the configuration value.

8. The system of claim 7, wherein one or more of the node circuits has:

four inputs extending outward from the node circuit in substantially orthogonal directions and four outputs extending outward from the node circuit in substantially orthogonal directions.

9. The system of claim 8, wherein a node circuit of the one or more node circuits comprises four node link circuits, each having:

four inputs connected respectively to the four inputs of the node circuit, and an output connected to a respective one of the four outputs of the node circuit.

10. The system of claim 7, wherein one of the processing element circuits includes 5,000 or fewer gates.

11. The system of claim 7, wherein one of the node circuits includes 2,000 or fewer gates.

12. The system of claim 7, wherein the scratch memory comprises:

a memory bank; and a memory controller, the memory controller comprising a plurality of row caches, one or more of the row caches having the same bit width as the data words, the memory controller being configured to transfer data to the row caches from the memory bank, and to the memory bank from the row caches, one or more of the row caches being configured to:
stream out a sequence of data words, and
stream in a sequence of data words.

13. The system of claim 12, wherein one of the row caches is a double buffer.

14. The system of claim 12, wherein:

the control portion of each data word has a width of four bits, and the data portion of each data word has a width of sixteen bits.

15. A method for calculating, the method comprising:

configuring a processing module, the processing module comprising:

a plurality of processing element circuits;

a communication fabric comprising a plurality of node link circuits each having a plurality of inputs and an output; and a scratch memory, the configuring comprising:

sending, by the scratch memory, a plurality of node link configuration words, each addressed to a node link circuit of the plurality of node link circuits;

receiving, by a first node link circuit of the plurality of node link circuits, a data word addressed to the first node link circuit, the first node link circuit having an output connected to an input of a first processing element circuit of the plurality of processing element circuits;

setting, by the first node link circuit, a configuration of the first node link circuit, to cause the first node link circuit to forward data words received at a first input of the first node link circuit to the output of the first node link circuit;

receiving, by the first input of the first node link circuit, a processing element configuration word;

sending, by the first input of the first node link circuit, the processing element configuration word to the first processing element circuit; and storing, by the first processing element circuit, in a control register of the first processing element circuit, a data portion of the processing element configuration word.

16. The method of claim 15, further comprising calculating a plurality of products, the calculating comprising sending, by the scratch memory, through a first path extending through a first plurality of node link circuits, a first sequence of operands to the first processing element circuit;

sending, by the scratch memory, through a second path extending through a second plurality of node link circuits, a second sequence of operands to the first processing element circuit;

calculating, by the first processing element circuit, a sequence of pairwise products, each pairwise product being a product of:

an operand of the first sequence of operands, and a corresponding operand of the second sequence of operands.

17. The method of claim 16, further comprising converting a first vector from a dense representation to a sparse representation, the first vector including a first element having a nonzero value immediately followed by a second element having a value of zero, the converting comprising substituting for the first element a first 2-tuple having:

a first element equal to the first element of the first vector, and a second element greater than one.

18. The method of claim 17, further comprising aligning a sparse representation of a second vector with the sparse representation of the first vector, the aligning comprising:

deleting from the sparse representation of the second vector a 2-tuple corresponding to the second element of the first vector, and increasing the value of the second element of a first 2-tuple of the second vector, the first 2-tuple of the second vector immediately preceding the deleted 2-tuple.

19. The method of claim 18, further comprising:

multiplying, by a processing element circuit of the plurality of processing element circuits, the first element of the first 2-tuple of the first vector by the first element of the first 2-tuple of the second vector, to form the first element of a result 2-tuple; and setting the second element of the result 2-tuple to be equal to the second element of the first 2-tuple of the first vector.

20. The method of claim 15, wherein one of the processing element circuits includes 5,000 or fewer gates, and one of the node link circuits includes 500 or fewer gates.

* * * * *